US012583876B2

(12) United States Patent
Liu et al.

(10) Patent No.: US 12,583,876 B2
(45) Date of Patent: Mar. 24, 2026

(54) BRANCHED ORGANOSILICON COMPOUND, METHOD OF PREPARING SAME, AND RELATED COMPOSITIONS

(71) Applicant: Dow Silicones Corporation, Midland, MI (US)

(72) Inventors: Nanguo Liu, Midland, MI (US); Michael Telgenhoff, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 721 days.

(21) Appl. No.: 17/419,018

(22) PCT Filed: Dec. 27, 2019

(86) PCT No.: PCT/US2019/068757

§ 371 (c)(1),
(2) Date: Jun. 28, 2021

(87) PCT Pub. No.: WO2020/142380

PCT Pub. Date: Jul. 9, 2020

(65) Prior Publication Data

US 2022/0119421 A1 Apr. 21, 2022

Related U.S. Application Data

(60) Provisional application No. 62/786,715, filed on Dec. 31, 2018.

(51) Int. Cl.

| | |
|---|---|
| ***C07F 7/08*** | (2006.01) |
| ***C08G 77/16*** | (2006.01) |
| ***C08G 77/18*** | (2006.01) |
| ***C08G 77/20*** | (2006.01) |
| ***C08G 77/24*** | (2006.01) |
| ***C08G 77/26*** | (2006.01) |
| ***C08K 5/17*** | (2006.01) |
| ***C08L 83/08*** | (2006.01) |

(52) U.S. Cl.

CPC ............ *C07F 7/0889* (2013.01); *C08G 77/16* (2013.01); *C08G 77/18* (2013.01); *C08G 77/20* (2013.01); *C08G 77/24* (2013.01); *C08G 77/26* (2013.01); *C08K 5/17* (2013.01); *C08L 83/08* (2013.01); *C08G 2150/00* (2013.01); *C08L 2203/162* (2013.01)

(58) Field of Classification Search

CPC ...... C08G 77/26; C08G 77/388; A61K 8/585; C07F 7/0838; C07F 7/18; C08K 5/16

See application file for complete search history.

(56) References Cited

U.S. PATENT DOCUMENTS

| | | | |
|---|---|---|---|
| 3,794,736 | A | 2/1974 | Abbott et al. |
| 4,127,872 | A | 11/1978 | Shen Lo |
| 4,242,483 | A | 12/1980 | Novicky |
| 4,365,074 | A | 12/1982 | Novicky |
| 4,644,046 | A | 2/1987 | Yamada |
| 4,657,959 | A | 4/1987 | Bryan et al. |
| 4,709,066 | A | 11/1987 | Chapman |
| 4,717,757 | A | 1/1988 | Dubois et al. |
| 4,940,766 | A | 7/1990 | Gay et al. |
| 5,391,600 | A | 2/1995 | Umeda et al. |
| 5,674,937 | A | 10/1997 | Berg et al. |

(Continued)

FOREIGN PATENT DOCUMENTS

| | | | |
|---|---|---|---|
| CN | 101321772 | A | 12/2008 |
| CN | 101356201 | A | 1/2009 |

(Continued)

OTHER PUBLICATIONS

D. J. Keddie, et al. 13 Organic Letters 6006-6009 (2011) (Year: 2011).*
STN/CA abstract for JP59086612 A (Year: 1984).*
RN 1631135-45-9 (Year: 2014).*
Machine assisted English translation of CN102382211A,, obtained from https://patents.google.com on Oct. 4, 2021, 8 pages.
Machine assisted English translation of CN104610337, obtained from https://patents.google.com on Oct. 4, 2021, 9 pages.
Machine assisted English translation of CN104910200, obtained from https://patents.google.com on Oct. 4, 2021, 8 pages.
Machine assisted English translation of DE4234846, obtained from https://patents.google.com on Oct. 4, 2021, 6 pages.
Machine assisted English translation of JP2011126807 obtained from https://patents.google.com on Oct. 5, 2021, 10 pages.
Machine assisted English translation of JP2011126808 obtained from https://patents.google.com on Oct. 5, 2021, 8 pages.
Machine assisted English translation of JP2014034568 obtained from https://patents.google.com on Oct. 5, 2021, 11 pages.
Machine assisted English translation of JP2014227388 obtained from https://patents.google.com on Oct. 5, 2021, 9 pages.
Machine assisted English translation of JP2014227358 obtained from https://patents.google.com on Oct. 5, 2021, 10 pages.
Machine assisted English translation of JP2015137252 obtained from https://patents.google.com on Oct. 5, 2021, 12 pages.

(Continued)

*Primary Examiner* — Alexander R Pagano
*Assistant Examiner* — Frank S. Hou
(74) *Attorney, Agent, or Firm* — Warner Norcross + Judd LLP

(57) ABSTRACT

A branched organosilicon compound ("compound") having the general formula $(R1)_3SiX—NR^2\text{-}D\text{-}Z(R^7)_a$ is provided. In the formula: each $R^1$ is selected from R and $—OSi(R^4)_3$, with the proviso that at least one $R^1$ is $—OSi(R^4)_3$; where each $R^4$ is selected from R, $—OSi(R^5)_3$, and $—[OSiR_2]_mOSiR_3$; where each $R^5$ is selected from R, $—OSi(R^6)_3$, and $—[OSiR_2]_mOSiR_3$; where each $R^6$ is selected from R and $—[OSiR_2]_mOSiR_3$; with the proviso that at least one of $R^4$, $R^5$ and $R^6$ is $—[OSiR_2]_mOSiR_3$; where each R is independently a substituted or unsubstituted hydrocarbyl group; and where $0 \leq m \leq 100$; each of X and D is an independently selected divalent linking group; each $R^2$ and $R^7$ is an independently selected substituted or unsubstituted hydrocarbyl group or H; Z is O or N; and subscript a is the valency of Z. Also provided is a method of preparing the compound and a composition including the compound.

8 Claims, No Drawings

(56) References Cited

U.S. PATENT DOCUMENTS

| | | | |
|---|---|---|---|
| 5,994,488 | A | 11/1999 | Yokota et al. |
| 6,420,504 | B1 | 7/2002 | Yoshitake et al. |
| 7,122,599 | B2 | 10/2006 | Haubennestel et al. |
| 7,317,117 | B2 | 1/2008 | Nakamura et al. |
| 10,047,199 | B2 | 8/2018 | Iimura et al. |
| 2002/0016383 | A1 | 2/2002 | Iwata et al. |
| 2003/0158435 | A1 | 8/2003 | Joyce et al. |
| 2005/0255074 | A1 | 11/2005 | Hanada et al. |
| 2007/0142583 | A1 | 6/2007 | Schorzman et al. |
| 2007/0161810 | A1 | 7/2007 | Schorzman et al. |
| 2008/0003195 | A1 | 1/2008 | Arnaud et al. |
| 2008/0293958 | A1 | 11/2008 | Bauer et al. |
| 2010/0105938 | A1 | 4/2010 | Tonomura et al. |
| 2011/0104222 | A1 | 5/2011 | Iida et al. |
| 2012/0177402 | A1 | 7/2012 | Taniguchi et al. |
| 2012/0269747 | A1 | 10/2012 | Iimura et al. |
| 2013/0060057 | A1 | 3/2013 | Daiss et al. |
| 2015/0126676 | A1 | 5/2015 | Backer et al. |
| 2015/0216787 | A1 | 8/2015 | Hori et al. |
| 2015/0232601 | A1 | 8/2015 | Furukawa et al. |
| 2015/0252125 | A1 | 9/2015 | Moro et al. |
| 2016/0108066 | A1 | 4/2016 | Goto |
| 2017/0101423 | A1 | 4/2017 | Akabane et al. |
| 2018/0071200 | A1 | 3/2018 | Moriya |
| 2018/0078486 | A1 | 3/2018 | Kadlec et al. |
| 2018/0155482 | A1 | 6/2018 | Jaunky et al. |
| 2019/0053999 | A1 | 2/2019 | Hori et al. |
| 2019/0119502 | A1 | 4/2019 | Sakurai et al. |
| 2020/0148831 | A1 | 5/2020 | Okamura |
| 2020/0222300 | A1 | 7/2020 | Souda et al. |
| 2020/0247928 | A1 | 8/2020 | Souda et al. |
| 2020/0339757 | A1 | 10/2020 | Tanaka et al. |
| 2021/0032804 | A1 | 2/2021 | Hamajima et al. |
| 2022/0081565 | A1 | 3/2022 | Liu |
| 2022/0106337 | A1* | 4/2022 | Liu ........................ C07F 7/0838 |
| 2022/0112224 | A1 | 4/2022 | Jeletic et al. |
| 2022/0112338 | A1 | 4/2022 | Liu et al. |
| 2022/0119421 | A1 | 4/2022 | Liu et al. |
| 2022/0119597 | A1* | 4/2022 | Liu ........................ C08G 77/20 |

FOREIGN PATENT DOCUMENTS

| | | | | |
|---|---|---|---|---|
| CN | 102382211 | A | | 3/2012 |
| CN | 104086578 | A | * | 10/2014 |
| CN | 104610337 | A | | 5/2015 |
| CN | 104910200 | A | | 9/2015 |
| CN | 105418831 | A | | 3/2016 |
| CN | 107666899 | A | | 2/2018 |
| DE | 4234846 | A1 | | 4/1994 |
| EP | 0281718 | A2 | | 9/1988 |
| EP | 0739947 | A2 | | 10/1996 |
| EP | 3208322 | B1 | | 3/2020 |
| GB | 2119951 | B | | 9/1986 |
| JP | S5087184 | A | | 7/1975 |
| JP | S587124 | A | | 1/1983 |
| JP | S5928127 | A | | 2/1984 |
| JP | 59086612 | A | * | 5/1984 |
| JP | S6174627 | A | | 4/1986 |
| JP | S61264319 | A | | 11/1986 |
| JP | S62240307 | A | | 10/1987 |
| JP | S62283313 | A | | 12/1987 |
| JP | H01319518 | A | | 12/1989 |
| JP | H05504596 | A | | 7/1993 |
| JP | H0736224 | A | | 2/1995 |
| JP | H07173178 | A1 | | 7/1995 |
| JP | H07196975 | A | | 8/1995 |
| JP | H07309714 | A | | 11/1995 |
| JP | H08302023 | A | | 11/1996 |
| JP | H09176172 | A | | 7/1997 |
| JP | 53960 | A | * | 2/1998 |
| JP | 2000072784 | | | 3/2000 |
| JP | 2001002732 | A | | 1/2001 |
| JP | 2001011186 | A | | 1/2001 |
| JP | 2006109985 | A | | 4/2006 |
| JP | 2007320960 | A | | 12/2007 |
| JP | 2010018612 | A | | 1/2010 |
| JP | 2010105941 | A | | 5/2010 |
| JP | 2011016732 | A | | 1/2011 |
| JP | 2011016733 | A | | 1/2011 |
| JP | 2011016734 | A | | 1/2011 |
| JP | 2011126807 | A | | 6/2011 |
| JP | 2011126808 | A | | 6/2011 |
| JP | 2011149017 | A | | 8/2011 |
| JP | 2012121950 | A | | 6/2012 |
| JP | 2013001672 | A | | 1/2013 |
| JP | 2014034568 | A | | 2/2014 |
| JP | 2014040388 | A | | 3/2014 |
| JP | 2014040511 | A | | 3/2014 |
| JP | 2014040512 | A5 | | 3/2014 |
| JP | 2014227358 | A | | 12/2014 |
| JP | 2015098451 | | | 5/2015 |
| JP | 2015137252 | A | | 7/2015 |
| JP | 2016008200 | A | | 1/2016 |
| JP | 2016088848 | A | | 5/2016 |
| JP | 2016121095 | A | | 7/2016 |
| JP | 2016160191 | A | | 9/2016 |
| JP | 2017071581 | A | | 4/2017 |
| JP | 2017201010 | A | | 11/2017 |
| JP | 2018043938 | A | | 3/2018 |
| JP | 2018090495 | A | | 6/2018 |
| JP | 2018097154 | A | | 6/2018 |
| JP | 2018177918 | A | | 11/2018 |
| JP | 2018531997 | A | | 11/2018 |
| JP | 2019112540 | A | | 7/2019 |
| JP | 6991236 | B2 | | 2/2022 |
| JP | 2022515662 | A | | 2/2022 |
| JP | 2022516107 | A | | 2/2022 |
| JP | 2022516126 | A | | 2/2022 |
| JP | 2022516511 | A | | 2/2022 |
| JP | 2022516514 | A | | 2/2022 |
| JP | 2022517913 | A | | 3/2022 |
| PL | 182004 | B1 | | 10/2001 |
| WO | 199200366 | A1 | | 1/1992 |
| WO | 2001044861 | A1 | | 6/2001 |
| WO | 2009056779 | A3 | | 5/2009 |
| WO | WO-2009056779 | A2 | * | 5/2009 ............. A61K 8/585 |
| WO | 2009146340 | A1 | | 12/2009 |
| WO | 2010026538 | A1 | | 3/2010 |
| WO | 2011049246 | A1 | | 4/2011 |
| WO | 2011051323 | A3 | | 5/2011 |
| WO | 2011078408 | A1 | | 6/2011 |
| WO | 2012143344 | A1 | | 10/2012 |
| WO | 2014087183 | A1 | | 6/2014 |
| WO | 2014154700 | A2 | | 10/2014 |
| WO | 2014154701 | A2 | | 10/2014 |
| WO | 2015092632 | A2 | | 6/2015 |
| WO | 2015097103 | A1 | | 7/2015 |
| WO | 2015097110 | A1 | | 7/2015 |
| WO | 2016030842 | A1 | | 3/2016 |
| WO | 2017037123 | A1 | | 3/2017 |
| WO | 2017050699 | A1 | | 3/2017 |
| WO | 2017050922 | A1 | | 3/2017 |
| WO | 2017061090 | A1 | | 4/2017 |
| WO | 2018111458 | A1 | | 6/2018 |
| WO | 2018186138 | A1 | | 10/2018 |
| WO | 2019003897 | A1 | | 1/2019 |
| WO | 2019003898 | A1 | | 1/2019 |
| WO | 2019155826 | A1 | | 8/2019 |

OTHER PUBLICATIONS

Machine assisted English translation of JP2016008200 obtained from https://patents.google.com on Oct. 5, 2021, 10 pages.

Machine assisted English translation of JP2016121095 obtained from https://patents.google.com on Oct. 6, 2021, 10 pages.

Machine assisted English translation of JP2016160191 obtained from https://patents.google.com on Oct. 6, 2021, 11 pages.

Machine assisted English translation of JP2018090495 obtained from https://patents.google.com on Oct. 6, 2021, 10 pages.

Machine assisted English translation of JPH07309714 obtained from https://patents.google.com on Oct. 6, 2021, 6 pages.

Machine assisted English translation of JP1995196975 obtained from https://patents.google.com on Oct. 6, 2021, 6 pages.

(56) References Cited

OTHER PUBLICATIONS

Machine assisted English translation of JP2000072784 obtained from https://patents.google.com on Oct. 6, 2021, 11 pages.
Machine assisted English translation of JP2001011186 obtained from https://patents.google.com on Oct. 6, 2021, 5 pages.
Machine assisted English translation of JP2011016732 obtained from https://patents.google.com on Oct. 6, 2021, 10 pages.
Machine assisted English translation of JP2011016733 obtained from https://patents.google.com on Oct. 6, 2021, 9 pages.
Machine assisted English translation of JP2011016734 obtained from https://patents.google.com on Oct. 6, 2021, 9 pages.
Machine assisted English translation of JP2013001672 obtained from https://patents.google.com on Oct. 6, 2021, 10 pages.
Machine assisted English translation of JP2015098451 obtained from https://patents.google.com on Oct. 7, 2021, 11 pages.
Machine assisted English translation of JP2016088848 obtained from https://patents.google.com on Oct. 7, 2021, 11 pages.
Machine assisted English translation of JPH07173178 obtained from https://patents.google.com on Oct. 7, 2021, 10 pages.
Machine assisted English translation of JPH07196975 obtained from https://patents.google.com on Oct. 7, 2021, 8 pages.
Machine assisted English translation of JPH0736224 obtained from https://patents.google.com on Oct. 7, 2021, 4 pages.
Machine assisted English translation of JPH09176172 obtained from https://patents.google.com on Oct. 7, 2021, 10 pages.
Machine assisted English translation of WO2018186138 obtained from https://patents.google.com on Oct. 7, 2021, 22 pages.
Machine assisted English translation of WO2009056779 obtained from https://patents.google.com on Oct. 7, 2021, 3 pages.
Grande, John B., The Piers-Rubinsztajn Reaction: New Routes to Structured Silicones. Diss. 201. 297 pages.
Grande, John B., et al. "Silicone Dendrons and Dendrimers From Orthogonal SiH Coupling Reactions" Polymer Chemistry, 2014, pp. 6728-6739, 5.23.
Hamid Javaherian Naghash et al., Synthesis and Characterization of a Nonionic Copolymeric Surfactant Based on a Monotelechelic Polydimethylsiloxane and Oxypropylated Acrylate Ester, Synthesis and Reactivity in Inorganic, Metal-organic, Nano-metal Chemistry, Apr. 21, 2014, pp. 514-522, Vo;. 44, No. 4.
David Mancardi et al., "Convenient Synthesis of Tributylsilyl Methacrylate," Synthetic Communications, Oct. 1, 2007, pp. 3873-3878, vol. 37, No. 21.
Sangkyu Lee et al., "Refractive Index Engineering of Transparent ZrO2—polydimethylsiloxane Nanocompositves," Journal of Materials Chemistry, Jan. 2018, p. 1751-1755, vol. 18, No. 15.
International Search Report for International Application No. PCT/US2019/068757, Mar. 16, 2020, four pages.
Machine assisted English translation of JPH01319518 obtained from https://patents.google.com on Oct. 7, 2021, 10 pages.
Machine assisted English translation JP2001002732A obtained from https://patents.google.com/patent on May 2, 2022, 13 pages.
Machine assisted English translation of JP2006109985A obtained from https://worldwide.espacenet.com/patent on Nov. 6, 2023, 18 pages.
Machine assisted English translation of JPS587124A obtained from https://worldwide.espacenet.com/patent on Nov. 6, 2023, 7 pages.
Machine assisted English translation of JPS5087184A obtained from https://worldwide.espacenet.com/patent on Feb. 26, 2024, 6 pages.
Machine assisted English translation of JPS61264319A obtained from https://worldwide.espacenet.com/patent on Feb. 26, 2024, 5 pages.
Machine assisted English translation of JP2012121950A obtained from https://worldwide.espacenet.com/patent on Jun. 5, 2023, 16 pages.
Machine assisted English translation of JPS6174627A obtained from https://worldwide.espacenet.com/patent on Apr. 15, 2024, 17 pages.
Machine assisted English translation of JP2018097154A obtained from https://worldwide.espacenet.com/patent on Apr. 15, 2024, 21 pages.
ACS Symposium Series, 2013, 59-78, Progress in Silicones and Silicone-Modified Materials, ISSN: 0097-6156.
Synthesis and Reactivity in Inorganic, Metal-Organic, and Nano-Metal Chemistry, 2014, 44, 514-522.
Machine assisted English translation of JP2019112540A obtained from <https://patents.google.com/patent> on Nov. 14, 2024, 17 pages.
Machine assisted English translation of CN105418831A obtained from https://patents.google.com/patent on Nov. 14, 2024, 10 pages.
Machine assisted English translation of PL182004B1 obtained from https://patents.google.com/patent on Nov. 4, 2024, 10 pages.

* cited by examiner

BRANCHED ORGANOSILICON COMPOUND, METHOD OF PREPARING SAME, AND RELATED COMPOSITIONS

CROSS-REFERENCE TO RELATED APPLICATIONS

This application is the National Stage of International Appl. No. PCT/US2019/068757 filed on 27 Dec. 2019, which claims priority to and all advantages of U.S. Provisional Patent No. 62/786,715 filed on 31 Dec. 2018, the content of which is hereby incorporated by reference.

FIELD OF THE INVENTION

The present invention generally relates to organosilicon compounds and, more specifically, to an amino-functional branched organosilicon compound, modifications thereof, methods of preparing the same, and compositions comprising the same.

DESCRIPTION OF THE RELATED ART

Silicones are polymeric materials used in numerous commercial applications, primarily due to significant advantages they possess over their carbon-based analogues. More precisely called polymerized siloxanes or polysiloxanes, silicones have an inorganic silicon-oxygen backbone chain ( . . . —Si—O—Si—O—Si—O— . . . ) with organic side groups attached to the silicon atoms.

Organic side groups may be used to link two or more of these backbones together. By varying the —Si—O— chain lengths, side groups, and crosslinking, silicones can be synthesized with a wide variety of properties and compositions. They can vary in consistency from liquid to gel to rubber to hard plastic. The most common siloxane is linear polydimethylsiloxane (PDMS), a silicone oil. The second largest group of silicone materials is based on silicone resins, which are formed by branched and cage-like oligosiloxanes.

Another group of silicone materials are silicone dendrimers. Dendrimers are polymers that have a highly branched structure which extends radially from a single core. A dendrimer is a repetitively branched molecule, typically symmetric (or near symmetric) around the core, and often adopts a spherical or ellipsoidal three-dimensional morphology. Dendritic polymers can also be described as tree-like macromolecules consisting of unique branch-upon-branch-upon-branch structural organizations or generations.

Dendritic silicones or macromolecules have molecular shapes, sizes, and functionality that provide for many potential end applications. Thus, there remains an opportunity to provide improved branched compounds based on silicon, as well as improved methods of forming such compounds. There also remains an opportunity to provide improved copolymers and improved compositions based on or having such compounds.

BRIEF SUMMARY

A branched organosilicon compound is provided. The branched organosilicon compound has the general formula:

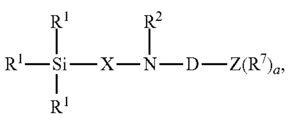

where each $R^1$ is selected from R and $—OSi(R^4)_3$, with the proviso that at least one $R^1$ is $—OSi(R^4)_3$; where each $R^4$ is selected from R, $—OSi(R^5)_3$, and $—[OSiR_2]_mOSiR_3$; where each $R^5$ is selected from R, $—OSi(R^6)_3$, and $—[OSiR_2]_mOSiR_3$; where each $R^6$ is selected from R and $—[OSiR_2]_mOSiR_3$; with the proviso that at least one of $R^4$, $R^5$ and $R^6$ is $—[OSiR_2]_mOSiR_3$; where each R is independently a substituted or unsubstituted hydrocarbyl group; and where $0 \leq m \leq 100$; X is a divalent linking group; D is a divalent linking group; $R^2$ is R or H; Z is O or N; $R^7$ is independently selected from substituted or unsubstituted hydrocarbyl groups and H in each moiety indicated by subscript a; and subscript a is the valency of Z.

A method of preparing the branched organosilicon compound is also provided. The method comprises reacting (A) an organosilicon compound comprising a halogen functional group and (B) an amino-functional compound to give the branched organosilicon compound.

A composition is also provided. The composition includes the branched organosilicon compound.

DETAILED DESCRIPTION OF THE INVENTION

A branched organosilicon compound has the general formula:

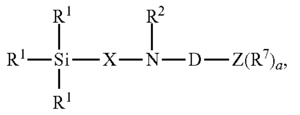

where each $R^1$ is selected from R and $—OSi(R^4)_3$, with the proviso that at least one $R^1$ is $—OSi(R^4)_3$; where each $R^4$ is selected from R, $—OSi(R^5)_3$, and $—[OSiR_2]_mOSiR_3$; where each $R^5$ is selected from R, $—OSi(R^6)_3$, and $—[OSiR_2]_mOSiR_3$; where each $R^6$ is selected from R and $—[OSiR_2]_mOSiR_3$; with the proviso that at least one of $R^4$, $R^5$ and $R^6$ is $—[OSiR_2]_mOSiR_3$; where each R is independently a substituted or unsubstituted hydrocarbyl group; and where $0 \leq m \leq 100$; X is a divalent linking group; D is a divalent linking group; $R^2$ is selected from substituted or unsubstituted hydrocarbyl groups and H; Z is O or N; $R^7$ is independently selected from substituted or unsubstituted hydrocarbyl groups and H in each moiety indicated by subscript a; and subscript a is the valency of Z.

Each R is independently selected and may be linear, branched, cyclic, or combinations thereof. Cyclic hydrocarbyl groups encompass aryl groups as well as saturated or non-conjugated cyclic groups. Cyclic hydrocarbyl groups may be monocyclic or polycyclic. Linear and branched hydrocarbyl groups may independently be saturated or unsaturated. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of R may be replaced with an atom other than carbon, i.e., R may include one or more heteroatoms within the chain, such as oxygen, sulfur, nitrogen, etc. Suitable alkyl groups are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups are exemplified by, but not limited to, phenyl, tolyl, xylyl, naphthyl, benzyl, and dimethyl phenyl. Suitable alkenyl groups include vinyl, allyl, propenyl, isopropenyl, butenyl, isobutenyl, pentenyl, heptenyl, hexenyl, and cyclohexenyl groups. Suitable monovalent halogenated hydrocarbon groups include, but are not limited to, a halogenated alkyl group of 1 to 6 carbon atoms, or a halogenated aryl group of 6 to 10 carbon atoms. Suitable halogenated alkyl groups are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups are exemplified by, but not limited to, the aryl groups described above where one or more hydrogen atoms is replaced with a halogen atom, such as F or Cl. For example, chlorobenzyl and fluorobenzyl are suitable halogenated aryl groups.

In specific embodiments, each R is independently an alkyl group having from 1 to 10, alternatively from 1 to 8, alternatively from 1 to 6, alternatively from 1 to 4, alternatively from 1 to 3, alternatively from 1 to 2, alternatively 1, carbon atom(s).

$R^2$ is independently selected from substituted hydrocarbyl groups, unsubstituted hydrocarbyl groups, and H. Examples of suitable substituted and unsubstituted groups include those described with respect to substituent R. As such, $R^2$ may be selected from R and H, although $R^2$ may be the same or different than any or each R of the branched organosilicon compound. In certain embodiments, $R^2$ is selected from alkyl groups and H. In some such embodiments, $R^2$ is an alkyl group having from 1 to 10, alternatively from 1 to 8, alternatively from 1 to 6, alternatively from 1 to 4, alternatively from 1 to 3, alternatively from 1 to 2, alternatively 1, carbon atom(s). In particular embodiments, $R^2$ is H.

Each $R^1$ is selected from R and $—OSi(R^4)_3$, with the proviso that at least one $R^1$ is $—OSi(R^4)_3$. In certain embodiments, at least two of $R^1$ are $—OSi(R^4)_3$. In specific embodiments, all three of $R^1$ are $—OSi(R^4)_3$. When a greater number of $R^1$ are $—OSi(R^4)_3$, the organosilicon compound has a greater level of branching. For example, when each $R^1$ is $—OSi(R^4)_3$ and the Si—X bond is a silicon-carbon bond, the silicon atom to which each $R^1$ is bonded is a T siloxy unit. Alternatively, when two of $R^1$ are $—OSi(R^4)_3$ and the Si—X bond is a silicon-carbon bond, the silicon atom to which each $R^1$ is bonded is a [D] siloxy unit.

Each $R^4$ is selected from R, $—OSi(R^5)_3$, and $—[OSiR_2]_m OSiR_3$, where $0 \leq m \leq 100$. Depending on a selection of $R^4$ and $R^5$, further branching can be present in the branched organosilicon compound. For example, when each $R^4$ is R, then each $—OSi(R^4)_3$ moiety is a terminal [M] siloxy unit. Said differently, when each $R^1$ is $—OSi(R^4)_3$, and when each $R^4$ is R, then each $R^1$ can be written as $OSiR_3$, and each $R^1$ is an [M] siloxy unit. In such embodiments, the branched organosilicon compound includes a [T] siloxy unit (to which X is bonded) capped by three [M] siloxy units. When $R^4$ is $—[OSiR_2]_m OSiR_3$, $R^4$ includes optional [D] siloxy units (i.e., those siloxy units in the moiety indicated by subscript m), and an [M] siloxy unit (represented by $OSiR_3$). Thus, for example, when each $R^1$ is $—OSi(R^4)_3$, and when each $R^4$ is $—[OSiR_2]_m OSiR_3$, then each $R^1$ includes a [Q] siloxy unit. In such embodiments, each $R^1$ is of formula $—OSi([OSiR_2]_m OSiR_3)_3$. When each m is 0, each $R^1$ is a [Q] siloxy unit endcapped with three [M] siloxy units. When m is greater than 0, each $R^1$ includes a linear moiety with a degree of polymerization being attributable to m. This linear moiety, if present, is generally a diorganosiloxane moiety.

Subscript m is from (and including) 0 to 100, alternatively from 0 to 80, alternatively from 0 to 60, alternatively from 0 to 40, alternatively from 0 to 20, alternatively from 0 to 19, alternatively from 0 to 18, alternatively from 0 to 17, alternatively from 0 to 16, alternatively from 0 to 15, alternatively from 0 to 14, alternatively from 0 to 13, alternatively from 0 to 12, alternatively from 0 to 11, alternatively from 0 to 10, alternatively from 0 to 9, alternatively from 0 to 8, alternatively from 0 to 7, alternatively from 0 to 6, alternatively from 0 to 5, alternatively from 0 to 4, alternatively from 0 to 3, alternatively from 0 to 2, alternatively from 0 to 1, alternatively is 0. Typically, each subscript m is 0 such that the branched moiety of the branched organosilicon compound is free from D siloxy units.

As set forth above, each $R^4$ can also be $—OSi(R^5)_3$. In such embodiments, depending a selection of $R^5$, further branching can be present in the branched organosilicon compound. Each $R^5$ is selected from R, $—OSi(R^6)_3$, and $—[OSiR_2]_m OSiR_3$, where m is defined above; where each $R^6$ is selected from R and $—[OSiR_2]_m OSiR_3$, where m is defined above. At least one of $R^4$, $R^5$ and $R^6$ is $—[OSiR_2]_m OSiR_3$, where m is defined above. When $R^1$ is of formula $—OSi(R^4)_3$, and when $R^4$ is of formula $—OSi(R^5)_3$, further siloxane bonds and branching is present in the branched organosilicon compound. This is further the case when $R^5$ is $—OSi(R^6)_3$ In particular, each subsequent R moiety in the branched organosilicon compound can impart a further generation of branching. For example, $R^1$ can be of formula $—OSi(R^4)_3$, $R^4$ can be of formula $—OSi(R^5)_3$, and $R^5$ can be $—OSi(R^6)_3$. Thus, depending on a selection of each substituent, further branching attributable to [T] and/or [Q] siloxy units may be present in the branched organosilicon compound.

X and D are each independently divalent linking groups. X and D are generally a function of the mechanism utilized to prepare the branched organosilicon compound. In certain embodiments, X and D are each independently divalent hydrocarbon group. When X and D are both independently divalent hydrocarbon groups, X and D each typically have from 2 to 18 carbon atoms, and may include substitution and/or heteroatoms therein/on. For example, X and D can each include one or more oxygen heteroatoms such that X and/or D comprises an ether moiety. Alternatively, X and/or D can merely comprise a pure hydrocarbon. In some embodiments, X and D each independently comprise, alternatively are, alkylene groups having the general formula $—(CH_2)_n—$, where subscript n is ≥1, such as from 1 to 18, alternatively from 1 to 16, alternatively from 1 to 12, alternatively from 1 to 10, alternatively from 1 to 8, alternatively from 1 to 6, alternatively from 2 to 6. In particular embodiments, subscript n is 3. It will be appreciated that X and D are each independently selected, and thus may be the same or different than one another. For example, in certain embodiments, X and D are the same divalent linking group. In other embodiments, X and D are different from one another (i.e., are different divalent linking groups with respect to one another). As but one example, in some such embodiments, X is an alkylene group having 3 carbon atoms and D is an alkylene group having 2 carbon atoms.

$R^2$ is independently selected from substituted hydrocarbyl groups, unsubstituted hydrocarbyl groups, and H. Examples of suitable substituted and unsubstituted groups include those described with respect to substituent R. As such, $R^2$ may be selected from R and H, although $R^2$ may be the same or different than any or each R of the branched organosilicon compound. In certain embodiments, $R^2$ is selected from alkyl groups and H. In some such embodiments, $R^2$ is an alkyl group having from 1 to 10, alternatively from 1 to 8, alternatively from 1 to 6, alternatively from 1 to 4, alternatively from 1 to 3, alternatively from 1 to 2, alternatively 1, carbon atom(s). In particular embodiments, $R^2$ is H and the branched organosilicon compound has the following general formula:

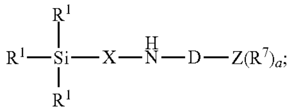

where each $R^1$, $R^7$, X, and D, and subscript a are independently selected and defined herein. In other embodiments, $R^2$ is R, i.e., an independently selected substituted or unsubstituted hydrocarbyl group. In some such embodiments, $R^2$ is an alkyl group. In specific embodiments, $R^2$ is methyl and the branched organosilicon compound has the following general formula:

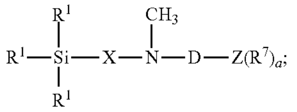

where each $R^1$, $R^7$, X, and D, and subscript a are independently selected and defined herein.

In the general formula above, Z is O or N, and subscript a is the valency of Z (i.e., exclusive of the bond to divelent linking group D). As such, in some embodiments, Z is O and subscript a is 1 such that the branched organosilicon compound has the formula:

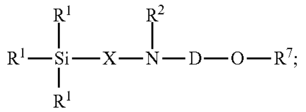

where each $R^1$, $R^2$, $R^7$, X, and D as defined herein. In other embodiments, Z is N and subscript a is 2 such that the branched organosilicon compound has the formula:

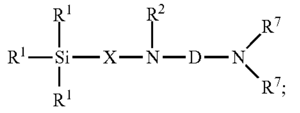

where each $R^1$, $R^2$, $R^7$, X, and D as defined herein.

As will be understood in view of the description of Z and subscript a above, the branched organosilicon compound comprises one substituent $R^7$ when Z is O (i.e., when the valency of Z is 1, exclusive of the bond to divelent linking group D, such that subscript a is 1), and two independently selected substituents $R^7$ when Z is N (i.e., when the valency of Z is 2, exclusive of the bond to divelent linking group D, such that subscript a is 1). Regardless of the particular Z selected, each instance of $R^7$ (i.e., in each moiety indicated by subscript a) is independently selected from substituted and unsubstituted hydrocarbyl groups and H. In particular embodiments, Z is O and $R^7$ is H. In other embodiments, Z is N and at least one $R^7$ is H. In these or other embodiments, Z is N and each $R^7$ is H. In other embodiments, at least one H, alternatively each H, is an independently selected substituted or unsubstituted hydrocarbyl group. Examples of suitable substituted and unsubstituted groups include those described with respect to substituent R. As such, each $R^7$ may be selected from R and H, although any or each $R^7$ may be the same or different than any or each R of the branched organosilicon compound. In certain embodiments, at least one $R^7$ is selected from alkyl groups. In some such embodiments, the at least one $R^7$ comprises, alternatively is, an alkyl group having from 1 to 10, alternatively from 1 to 8, alternatively from 1 to 6, alternatively from 1 to 4, alternatively from 1 to 3, alternatively from 1 to 2, alternatively 1, carbon atom(s). In particular embodiments, Z is N, one $R^7$ is H, and the other $R^7$ is an alkyl group.

In some embodiments, $R^7$ is a carbonyl group having the general formula —C(O)$R^8$, where $R^8$ is a substituted or unsubstituted hydrocarbon group. For example, in some such embodiments, $R^8$ has the general formula —$C(CH_2)R^9$, where $R^9$ is a substituted or unsubstituted hydrocarbyl group (e.g. an alkyl group) or H, and the moiety $R^7$ is an α,β-unsaturated carbonyl group. In specific such embodiments, Z is O such that the moiety represented by subformula —Z—$R^7$ is an acryloxy moiety (e.g. an acrylate, methacrylate, etc.). In particular embodiments, $R^8$ has the general formula -$D^1$-Y, where $D^1$ is a divalent linking group and Y is a functional group comprising at least one O or N atom. In such embodiments, $D^1$ is not particularly limited, and may comprise, alternatively may be, any of the divalent linking groups described herein (e.g. such as those described above with respect to X and/or D). As such, $D^1$ may comprise, alternatively may be, a substituted or unsubstituted hydrocarbon moiety, such as an alkyl moiety, an alkene moiety, an ether moiety, etc., or a combination thereof. Functional group Y is not limited, and may be group comprising at least one O or N atom, such an ether, ester, carbonyl, carbonate, carboxyl, alcohol, amine, amide, imine, nitrile, etc., or combinations thereof. In some such embodiments, Y is a divalent functional group comprising at least one O or N atom, such that $R^8$ has the general formula -$D^1$-Y—$R^{10}$, where $D^1$ and Y are as described above, and $R^{10}$ is a substituted or unsubstituted hydrocarbon group or H.

In particular embodiments, $R^7$ has one of the following formulas (i)-(iii).

(i)

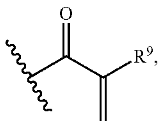

(ii)

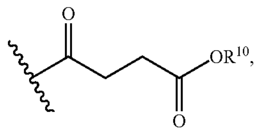

-continued (iii)

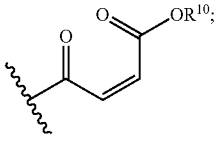

where each $R^9$ and $R^{10}$ is independently selected and as defined above. In some such embodiments, $R^7$ of the amino-functional compound (B) has formula (i) and $R^9$ is H or methyl. In certain embodiments, $R^7$ of the amino-functional compound (B) has one of formulas (ii) and (iii) and $R^{10}$ is H, such that $R^7$ comprises a carboxylic acid group.

Importantly, each of R, $R^1$, $R^4$, $R^5$, and $R^6$ are independently selected. As such, the descriptions above relating to each of these substituents is not meant to mean or imply that each substituent is the same. Any description above relating to $R^1$ may relate to only one $R^1$ or any number of $R^1$ in the branched organosilicon compound, and so on.

In addition, different selections of R, $R^1$, $R^4$, $R^5$, and $R^6$ can result in the same structures. For example, if $R^1$ is $-OSi(R^4)_3$, and if each $R^4$ is $-OSi(R^5)_3$, and if each $R^5$ is R, then $R^1$ can be written as $-OSi(OSiR_3)_3$. Similarly, if $R^1$ is $-OSi(R^4)_3$, and if each $R^4$ is $-[OSiR_2]_mOSiR_3$, where m is 0, then $R^1$ can be written as $-OSi(OSiR_3)_3$. This results in the same structure for $R^1$ based on different selections for $R^4$. To that end, at least one of $R^4$, $R^5$ and $R^6$ is $-[OSiR_2]_mOSiR_3$. However, when m is 0, this proviso can be inherently met through alternative selections. For example, as noted above, if each $R^4$ is $-OSi(R^5)_3$, and if each $R^5$ is R, then $R^1$ can be written as $-OSi(OSiR_3)_3$, which is the same as if $R^1$ is $-OSi(R^4)_3$, and if each $R^4$ is $-[OSiR_2]_mOSiR_3$, where m is 0. It shall be considered that the proviso is met even if alternative selections can result in the same structures as required in the proviso.

In certain embodiments, each $R^1$ is $-OSi(R^4)_3$. In specific embodiments in which each $R^1$ is $-OSi(R^4)_3$, at least one $R^4$ is $-[OSiR_2]_mOSiR_3$, where m is 0. Because m is 0, the at least one $R^4$ is $-OSiR_3$. This is the same structure as if at least one $R^4$ is $-OSi(R^5)_3$, and if each $R^5$ is R. Both selections result in at least one $R^4$ being $-OSiR_3$. Thus, if at least one $R^4$ is $-OSi(R^5)_3$, and if each $R^5$ is R, it shall also be considered that at least one of $R^4$ is $-[OSiR_2]_mOSiR_3$, where m is 0.

The same is true for further generations of branching in the branched organosilicon compound. For example, just as different selections associated with $R^4$ and $R^5$ can result in the same structure above, different selections for $R^5$ and $R^6$ can similarly result in the same structure.

In certain embodiments, each $R^1$ is $-OSi(R^4)_3$. In specific embodiments in which each $R^1$ is $-OSi(R^4)_3$, one $R^4$ is R in each $-OSi(R^4)_3$ such that each $R^1$ is $-OSiR(R^4)_2$. In further specific embodiments, two $R^4$ in $-OSiR(R^4)_2$ are each $-OSi(R^5)_3$ moieties such that the branched organosilicon compound has the following structure:

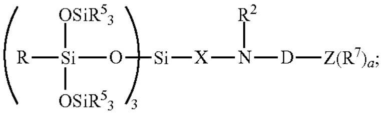

where each R, $R^2$, $R^5$, $R^7$, X, D, and subscript a are independently selected and defined above. In certain embodiments, each $R^5$ is R, and each R is methyl.

As noted above, the same structure of the branched organosilicon compound can result from different selections. For example, the same branched organosilicon compound as exemplified above results with the following selections: each $R^1$ is $-OSi(R^4)_3$, where one $R^4$ is R and two of $R^4$ are $-[OSiR_2]_mOSiR_3$, where m is 0. Thus, in the structure exemplified above, the proviso that at least one of $R^4$, $R^5$ and $R^6$ be $-[OSiR_2]_mOSiR_3$ is met regardless of the selections of $R^4$ and $R^5$ utilized to arrive at the resulting structure.

In other embodiments, one $R^1$ is R, and two of $R^1$ are $-OSi(R^4)_3$. In specific embodiments in which two of $R^1$ is $-OSi(R^4)_3$, one $R^4$ is R in each $-OSi(R^4)_3$ such that two of $R^1$ are $-OSiR(R^4)_2$. In further specific embodiments, each $R^4$ in $-OSiR(R^4)_2$ is $-OSi(R^5)_3$ such that the branched organosilicon compound has the following structure:

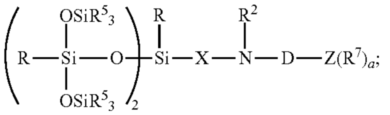

where each R, $R^2$, $R^5$, $R^7$, X, D, and subscript a are independently selected and defined above. In certain embodiments, each $R^5$ is R, and each R is methyl.

As noted above, the same structure of the branched organosilicon compound can result from different selections. For example, the same branched organosilicon compound as exemplified above results with the following selections: one $R^1$ is R; two of $R^1$ are $-OSi(R^4)_3$, where one $R^4$ is R and two of $R^4$ are $-[OSiR_2]_mOSiR_3$, where m is 0, in each $-OSi(R^4)_3$. Thus, in the structure exemplified above, the proviso that at least one of $R^4$, $R^5$ and $R^6$ be $-[OSiR_2]_mOSiR_3$ is met regardless of the selections of $R^4$ and $R^5$ utilized to arrive at the resulting structure.

In yet other embodiments, two of $R^1$ are R, and one $R^1$ is $-OSi(R^4)_3$. In specific embodiments in which one of $R^1$ is $-OSi(R^4)_3$, and one $R^4$ is R in $-OSi(R^4)_3$ such that this specific $R^1$ is $-OSiR(R^4)_2$. In further specific embodiments, each $R^4$ in $-OSiR(R^4)_2$ is $-OSi(R^5)_3$ such that the branched organosilicon compound has the following structure:

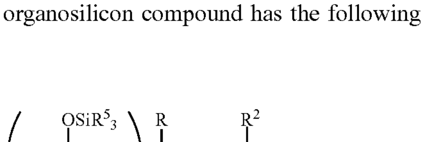

where each R, $R^2$, $R^5$, $R^7$, X, D, and subscript a are independently selected and defined above. In certain embodiments, each $R^5$ is R, and each R is methyl.

As noted above, the same structure of the branched organosilicon compound can result from different selections. For example, the same branched organosilicon compound as exemplified above results with the following selections: two of $R^1$ are R; one of $R^1$ is $-OSi(R^4)_3$, where one $R^4$ is R and two of $R^4$ are $-[OSiR_2]_mOSiR_3$, where m is 0, in $-OSi(R^4)_3$. Thus, in the structure exemplified above, the proviso that at least one of $R^4$, $R^5$ and $R^6$ be $-[OSiR_2]_mOSiR_3$ is met regardless of the selections of $R^4$ and $R^5$ utilized to arrive at the resulting structure.

In the exemplary structures set forth above, each $R^5$ is R, and each R is methyl. However, further generational branching can be introduced into the branched organosilicon compound when $R^5$ is other than R, i.e., when $R^5$ is selected from $OSi(R^6)_3$, and $—[OSiR_2]_mOSiR_3$, where m is defined above; where each $R^6$ is selected from R and $—[OSiR_2]_mOSiR_3$, where m is defined above.

Method of Preparing the Branched Organosilicon Compound

A method of preparing the branched organosilicon compound (the "preparation method") is also provided. The preparation method includes reacting (A) an organosilicon compound comprising a halogen functional group and (B) an amino-functional compound to give the branched organosilicon compound.

Reacting the organosilicon compound (A) and the amino-functional compound (B) generally comprises combining and/or contacting the organosilicon compound (A) and the amino-functional compound (B). Said differently, there is generally no proactive step required for the reaction reduction beyond combining the organosilicon compound (A) and the amino-functional compound (B), although various optional steps are described herein.

Organosilicon Compound (A)

In general, the organosilicon compound (A) is a branched organosilicon compound having one halogen-functional group (i.e., is monohalo functional). Specifically, the organosilicon compound (A) has the general formula (I):

(I)

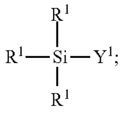

where the organosilicon moiety represented by the subformula $R^1{}_3Si—$ is as defined above with respect to the branched organosilicon compound, and the $Y^1$ comprises the halogen-functional group.

More specifically, with reference to formula (I), $Y^1$ comprises the halogen-functional group, as described below; and each $R^1$ is generally selected from R and $—OSi(R^4)_3$, with the proviso that at least one $R^1$ is $—OSi(R^4)_3$; each $R^4$ is selected from R, $—OSi(R^5)_3$, and $—[OSiR_2]_mOSiR_3$; each $R^5$ is selected from R, $—OSi(R^6)_3$, and $—[OSiR_2]_mOSiR_3$; and each $R^6$ is selected from R and $—[OSiR_2]_mOSiR_3$; with the proviso that at least one of $R^4$, $R^5$ and $R^6$ is $—[OSiR_2]_mOSiR_3$. In each instance, each R is independently a substituted or unsubstituted hydrocarbyl group, and each subscript m is selected such that $0 \leq m \leq 100$. Notwithstanding the above, one of skill in the art will readily understand the particular variations of limitations of the organosilicon moiety $R^1{}_3Si—$ in view of the description of the branched organosilicon compound described above.

The halogen-functional group $Y^1$ is not particularly limited, and may be any halogen-functional group suitable for preparing the branched organosilicon compound in accordance with the method herein. In general, the halogen-functional group comprises a carbon-bonded halogen atom and, in particular, an sp3 hybridized carbon atom. As such, the halogen-functional group $Y^1$ generally comprises, alternatively is, an organohalide group, such as an alkyl halide group. General examples of organohalides, and alkyl halides, include the hydrocarbyl groups described above with respect to substituent R, where such hydrocarbyl groups comprise one halogen substitution (e.g. in place of an otherwise carbon-bonded hydrogen atom).

The particular halogen atom present in the halogen-functional group $Y^1$ is not limited, and may be selected from fluorine (F), chlorine (Cl), bromine (Br), iodine (I), and astatine (At). Typically, the halogen atom is selected from chlorine and bromine. In particular embodiments, the halogen atom is chlorine, such that the halogen-functional group $Y^1$ comprises, alternatively is, a chlorine-functional group.

In certain embodiments, the halogen-functional group $Y^1$ has the general formula $—X—R^3$, where X is the independently selected divalent linking group described above with respect to the branched organosilicon compound, and $R^3$ is a halogen atom. In some such embodiments, $R^3$ is chlorine or bromine. As but one example, in particular embodiments, $R^3$ is chlorine, such that the organosilicon compound (A) has the formula:

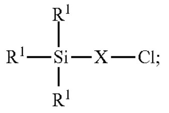

where each $R^1$ and X is independently selected and as defined above.

In particular embodiments, X comprises, alternatively is, the alkylene group having the general formula $—(CH_2)_n—$, where subscript n is $\geq 1$, such as from 1 to 18, alternatively from 1 to 16, alternatively from 1 to 12, alternatively from 1 to 10, alternatively from 1 to 8, alternatively from 1 to 6, alternatively from 2 to 6. In particular such embodiments, subscript n is 3 and $R^3$ is chlorine, such that the organosilicon compound (A) has the formula:

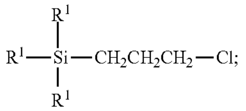

where each $R^1$ is independently selected and as defined above.

As will be appreciated from the description of the branched organosilicon compound, which will be understood to equally apply to the preparation method unless indicated otherwise, the selection of each of R, $R^1$, $R^4$, $R^5$, $R^6$, X, and subscript m, where present, is not limited, and includes any and all selections and combination of selections necessary for preparing the branched organosilicon compound as described above. For example, in certain embodiments, the organosilicon compound (A) has the general formula (I) where each $R^1$ is independently of the formula $—OSi(R^4)_3$, where at least one $R^4$ is $—[OSiR_2]_mOSiR_3$, and where each R and m are independently selected and as defined above.

In some embodiments, the organosilicon compound (A) has the following formula:

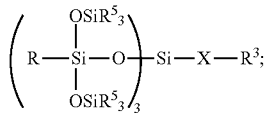

where each R, $R^3$, $R^5$, and X are independently selected and defined above. In certain embodiments, each $R^5$ is R, each R is methyl, and $R^3$ is chlorine.

In particular embodiments, the organosilicon compound (A) has the following structure:

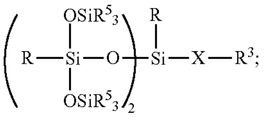

where each R, $R^3$, $R^5$, and X are independently selected and defined above. In certain embodiments, each $R^5$ is R, each R is methyl, and $R^3$ is chlorine.

In certain embodiments, the organosilicon compound (A) has the following structure:

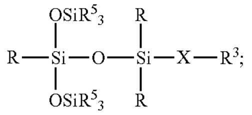

where each R, $R^3$, $R^5$, and X are independently selected and defined above. In certain embodiments, each $R^5$ is R, each R is methyl, and $R^3$ is chlorine.

The organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, an aqueous solvent (e.g. water), or combinations thereof. In certain embodiments, the organosilicon compound (A) is utilized in the absence of a carrier vehicle. In some such embodiments, the organosilicon compound (A) is utilized absent water and carrier vehicles/volatiles reactive with the organosilicon compound (A) and/or the functional compound (B). For example, in certain embodiments, the method may comprise stripping the organosilicon compound (A) of volatiles and/or solvents (e.g. organic solvents, water, etc.). Techniques for stripping the organosilicon compound (A) are known in the art, and may include distillation, heating, applying reduced pressure/vacuum, azeotroping with solvents, utilizing molecular sieves, etc., and combinations thereof.

The organosilicon compound (A) may be utilized in any amount, which will be selected by one of skill in the art, e.g. dependent upon the particular amino-functional compound (B) selected, the reaction parameters employed, the scale of the reaction (e.g. total amounts of component (A) and/or (B) to be reacted and/or the branched organosilicon compound to be prepared), etc.

Amino-Functional Compound (B)

The amino-functional compound (B) is not particularly limited, and may be any compound suitable for substituting the halogen of the halogen-functional group $Y^1$ with the amino group of formula $—N(R^2)\text{-}D\text{-}Z(R^7)_a$ described above with respect to the branched organosilicon compound (e.g. via a substitution reaction, displacement reaction, alkylation reaction, etc.), as will be understood by one of skill in the art in view of the description herein.

In general, the amino-functional compound (B) has the following general formula (II):

(II)

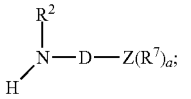

where the amino group of formula $—N(R^2)\text{-}D\text{-}Z(R^7)_a$ is as defined above with respect to the branched organosilicon compound.

More specifically, with reference to formula (II), $R^2$ independently selected from substituted or unsubstituted hydrocarbyl groups and H; D is a divalent linking group; Z is O or N; $R^7$ is independently selected from substituted or unsubstituted hydrocarbyl groups and H in each moiety indicated by subscript a; and subscript a is the valency of Z. Notwithstanding the above, one of skill in the art will readily understand the particular variations of limitations of the amino group of formula $—N(R^2)\text{-}D\text{-}Z(R^7)_a$ in view of the description of the branched organosilicon compound described above.

In particular embodiments, D comprises, alternatively is, the alkylene group having the general formula $—(CH_2)_n—$, where subscript n is ≥1, such as from 1 to 18, alternatively from 1 to 16, alternatively from 1 to 12, alternatively from 1 to 10, alternatively from 1 to 8, alternatively from 1 to 6, alternatively from 2 to 6. As but one example, in some such embodiments, D is an alkylene group having 2 carbon atoms. In other such embodiments, D is an alkylene group having 3 carbon atoms, and has the formula $—CH_2CH_2CH_2—$ or $—CH_2CH(CH_3)—$. In certain such embodiments, D is an unbranched alkylene group having 5 or 6 carbon atoms (i.e., is a pentylene or hexylene group).

In specific embodiments, $R^2$ is selected from alkyl groups and H. In some such embodiments, $R^2$ is an alkyl group having from 1 to 10, alternatively from 1 to 8, alternatively from 1 to 6, alternatively from 1 to 4, alternatively from 1 to 3, alternatively from 1 to 2, alternatively 1, carbon atom(s). In particular embodiments, $R^2$ is H and the amino-functional compound (B) has the formula:

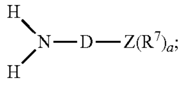

where each $R^7$, D, and subscript a are independently selected and defined herein. In other embodiments, $R^2$ is R, i.e., an independently selected substituted or unsubstituted hydrocarbyl group. In some such embodiments, $R^2$ is an alkyl group. In specific embodiments, $R^2$ is methyl and the amino-functional compound (B) has the following general formula:

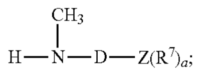

where each $R^7$, D, and subscript a are independently selected and defined herein.

In the general formula (II) above, Z is O or N, and subscript a is the valency of Z (i.e., exclusive of the bond to divelent linking group D). As such, in some embodiments, Z is O and subscript a is 1 such that the amino-functional compound (B) has the formula:

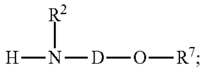

where each of $R^2$, $R^7$, and D are as defined herein. In some such embodiments, $R^2$ is H or methyl. In these or other embodiments, $R^7$ is H, such that the amino-functional compound (B) may be defined as an aminoalcohol. In these or other embodiments, D is the alkylene group having the general formula $—(CH_2)_n—$, where subscript n is 2, 3, 4, 5, or 6. In specific embodiments, D has the formula $—CH_2CH(CH_3)—$.

In other embodiments, Z is N and subscript a is 2 such that the amino-functional compound (B) may be defined as a diamine, and has the formula:

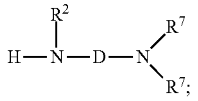

where each $R^2$, $R^7$, and D are as defined herein. In some such embodiments, $R^2$ is H or methyl. In these or other embodiments, each $R^7$ is H. In these or other embodiments, D is the alkylene group having the general formula $—(CH_2)_n—$, where subscript n is 2, 3, 4, 5, or 6. In specific embodiments, D has the formula $—CH_2CH(CH_3)—$.

In specific embodiments, the amino-functional compound (B) is an aminoalcohol or a diamine, and is selected from the following formulas (IIa)-(IIg):

(IIa)

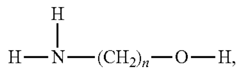

(IIb)

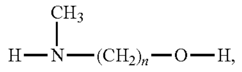

(IIc)

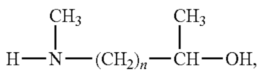

(IId)

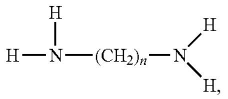

(IIe)

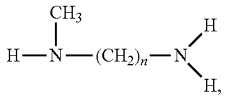

(IIf)

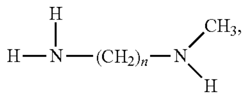

-continued (IIg)

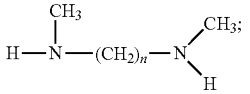

where each subscript n is independently from 1 to 6.

In some embodiments, $R^7$ of the amino-functional compound (B) is a carbonyl group having the general formula $—C(O)R^8$, where $R^8$ is a substituted or unsubstituted hydrocarbon group. For example, in some such embodiments, $R^8$ has the general formula $—C(CH_2)R^9$, where $R^9$ is a substituted or unsubstituted hydrocarbyl group (e.g. an alkyl group) or H, and the moiety $R^7$ is an α,β-unsaturated carbonyl group. In specific such embodiments, Z is O such that the moiety represented by subformula $—Z—R^7$ is an acryloxy moiety (e.g. an acrylate, methacrylate, etc.). In particular embodiments, $R^8$ has the general formula $-D^1-Y$, where $D^1$ is a divalent linking group and Y is a functional group comprising at least one O or N atom. In such embodiments, $D^1$ is not particularly limited, and may comprise, alternatively may be, any of the divalent linking groups described herein (e.g. such as those described above with respect to X and/or D). As such, $D^1$ may comprise, alternatively may be, a substituted or unsubstituted hydrocarbon moiety, such as an alkyl moiety, an alkene moiety, an ether moiety, etc., or a combination thereof. Functional group Y is not limited, and may be group comprising at least one O or N atom, such an ether, ester, carbonyl, carbonate, carboxyl, alcohol, amine, amide, imine, nitrile, etc., or combinations thereof. In some such embodiments, Y is a divalent functional group comprising at least one O or N atom, such that $R^8$ has the general formula $-D^1-Y—R^{10}$, where $D^1$ and Y are as described above, and $R^{10}$ is a substituted or unsubstituted hydrocarbon group or H.

In particular embodiments, $R^7$ of the amino-functional compound (B) has one of the following formulas (i)-(iii).

(i)

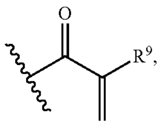

(ii)

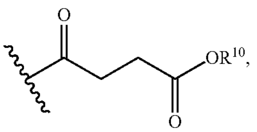

(iii)

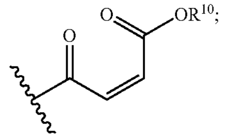

where each $R^9$ and $R^{10}$ is independently selected and as defined above. In some such embodiments, $R^7$ of the amino-functional compound (B) has formula (i) and $R^9$ is H or methyl. In certain embodiments, $R^7$ of the amino-functional compound (B) has one of formulas (ii) and (iii) and $R^{10}$ is H, such that $R^7$ comprises a carboxylic acid group.

The amino-functional compound (B) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof.

In certain embodiments, the amino-functional compound (B) is utilized in the absence of a carrier vehicle. In some such embodiments, the amino-functional compound (B) is utilized absent water and carrier vehicles/volatiles reactive with the organosilicon compound (A) and/or the amino-functional compound (B). For example, in certain embodiments, the method may comprise stripping the amino-functional compound (B) of volatiles and/or solvents (e.g. organic solvents, water, etc.). Techniques for stripping the amino-functional compound (B) are known in the art, and may include distillation, heating, applying reduced pressure/vacuum, azeotroping with solvents, utilizing molecular sieves, etc., and combinations thereof.

In certain embodiments, the method comprises utilizing more than one amino-functional compound (B), such as 2, 3, 4, or more amino-functional compounds (B). In such embodiments, each amino-functional compound (B) is independently selected, and may be the same or different from any other amino-functional compound (B).

The amino-functional compound (B) may be utilized in any amount, which will be selected by one of skill in the art, e.g. dependent upon the particular organosilicon compound (A) and/or amino-functional compound (B) selected, the reaction parameters employed, the scale of the reaction (e.g. total amounts of component (A) and/or (B) to be reacted and/or the branched organosilicon compound to be prepared), etc.

The organosilicon compound (A) and the amino-functional compound (B) are typically reacted in a molar ratio of from 1.5:1 to 1:1.5, alternatively from 1.4:1 to 1:1.4, alternatively from 1.3:1 to 1:1.3, alternatively from 1.2:1 to 1:1.2, alternatively from 1.1:1 to 1:1.1, alternatively from 1.1:1 to 1:1. However, the relative amounts of the organosilicon compound (A) and the amino-functional compound (B) utilized may vary, e.g. based upon the particular organosilicon compound (A) selected, the particular the amino-functional compound (B) selected, the reaction parameters employed, etc. As will be understood by those of skill in the art in view of the description herein, the reaction of the organosilicon compound (A) and the amino-functional compound (B) to prepare the branched organosilicon compound occurs at a theoretical maximum molar ratio of 1:1 (A):(B). However, an excess of the one of the components is typically utilized to fully consume one of compounds (A) or (B), e.g. to simplify purification of the reaction product formed, etc. For example, in certain embodiments, compound (B) is utilized in relative excess to maximize a conversion rate of the organosilicon compound (A) to the branched organosilicon compound.

In certain embodiments, the organosilicon compound (A) and the amino-functional compound (B) are reacted in a molar ratio of from 1 to 10 (A):(B). For example, in certain embodiments, the organosilicon compound (A) and the amino-functional compound (B) are reacted in a molar ratio of from 1:1 to 1:10, such as from 1:1.1 to 1:10, alternatively of from 1:1.5 to 1:10, alternatively of from 1:2 to 1:10, alternatively of from 1:2.5 to 1:10, alternatively of from 1:3 to 1:10, alternatively of from 1:4 to 1:10, alternatively of from 1:5 to 1:10, alternatively of from 1:6 to 1:10, (A):(B). In some embodiments, the organosilicon compound (A) and the amino-functional compound (B) are reacted in a molar ratio of from 1:1 to 20:1, such as from 1.1:1 to 20:1, alternatively of from 1.5:1 to 20:1, alternatively of from 2:1 to 20:1, alternatively of from 2.5:1 to 20:1, alternatively of from 3:1 to 20:1, alternatively of from 4:1 to 20:1, alternatively of from 5:1 to 20:1, alternatively of from 10:1 to 20:1, alternatively of from 15:1 to 20:1, (A):(B). It will be appreciated that ratios outside of these ranges may be utilized as well. For example, in certain embodiments, the amino-functional compound (B) is utilized in a gross excess (e.g. in an amount of ≥10, alternatively ≥15, alternatively ≥20, times the molar amount of the organosilicon compound (A)), such as when the amino-functional compound (B) is utilized as a carrier (i.e., a solvent, diluent, etc.) during the reaction.

Catalyst (C)

In certain embodiments, the organosilicon compound (A) and the amino-functional compound (B) are reacted in the presence of (C) a catalyst. The catalyst is not limited, and may be any catalyst suitable for facilitating the substitution of the halogen of $Y^1$ of the organosilicon compound (A) with the amino group of the functional compound (B) (e.g. via a substitution reaction, displacement reaction, amination reaction, alkylation reaction, etc.), as will be understood by one of skill in the art in view of the description herein.

In certain embodiments, the catalyst (C) is a base, such as carbonate base (e.g. $Na_2CO_3$, $CaCO_3$, $MgCO_3$, etc.), a hydroxide base (e.g. $Mg(OH)_2$, etc.), a metal oxide base (e.g. ZnO, MgO, etc.), an amine base (e.g. pyridine, etc.), and combinations thereof. In certain embodiments, the method comprises utilizing more than one catalyst (C), such as 2 different catalysts (C). In such embodiments, each catalyst (C) is independently selected, and may be the same or different from any other catalyst (C) being utilized. For example, in some embodiments, the catalyst (C) is a combination of sodium iodide and potassium iodide (i.e., is a mixed-salt catalyst). In particular embodiments, the organosilicon compound (A) and the amino-functional compound (B) are reacted in the absence of any discreet catalyst, e.g. such as when the amino-functional compound (B) is utilized in excess of the organosilicon compound (A) and itself acts as a base in the reaction of the components (A) and (B).

Methods of preparing compounds suitable for use in, or as, catalyst (C) are well known in the art, and many of the compounds listed herein are commercially available from various suppliers. As such, the catalyst (C) may be prepared as part of the method, or otherwise obtained (i.e., as a prepared compound).

The catalyst (C) may be utilized in any form, such as neat (i.e., absent solvents, carrier vehicles, diluents, etc.), or disposed in a carrier vehicle, such as a solvent or dispersant (e.g. such as any of those listed above with respect to the organosilicon compound (A)). In some embodiments, the catalyst (C) is utilized in the absence of water and carrier vehicles/volatiles reactive with the organosilicon compound (A), the amino-functional compound (B), and/or the catalyst (C) itself (i.e., until combined with components (A) and (B). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected, the reaction parameters employed, the scale of the reaction (e.g. total amounts of components (A) and (B)), etc. The molar ratio of the catalyst (C) to components (A) and/or (B) utilized in the reaction may influence the rate and/or amount of the reaction of components (A) and (B) to prepare the branched organosilicon compound therewith. Thus, the amount of the catalyst (C) as compared to components (A) and/or (B), as well as the molar ratios therebetween, may vary. Typically, these relative amounts and the molar ratio are selected to maximize coupling of components (A) and (B) to prepare the branched organosilicon compound (e.g. for increased economic efficiency of the reaction, increased ease of purification of the reaction product formed, etc.).

In certain embodiments, the catalyst (C) is utilized in a molar ratio of from 0.1 to 2 (A):(C). For example, in certain embodiments, the organosilicon compound (A) and the catalyst (C) are utilized in a molar ratio of from 1:1 to 1:10, such as from 1:1.1 to 1:10, alternatively of from 1:1.2 to 1:10, alternatively of from 1:1.2 to 1:8, alternatively of from 1:1.2 to 1:6, alternatively of from 1:1.2 to 1:4, alternatively of from 1:1.1 to 1:2, (A):(C). It will be appreciated that ratios outside of these ranges may be utilized as well. For example, in certain embodiments, the catalyst (C) is utilized in a gross excess (e.g. in an amount of ≥10, alternatively ≥15, alternatively ≥20, times the molar amount of the organosilicon compound (A)), such as when the catalyst (C) is utilized as a carrier (i.e., a solvent, diluent, etc.) during the reaction.

Typically, the reaction of components (A) and (B) to prepare the branched organosilicon compound is carried out in a vessel or reactor. When the reaction is carried out at an elevated temperature, as described below, the vessel or reactor may be heated in any suitable manner, e.g. via a jacket, heating mantle, hotplate, coils, etc.

Components (A), (B), and optionally (C), may be fed together or separately to the vessel, or may be disposed in the vessel in any order of addition, and in any combination. For example, in certain embodiments, component (B), and optionally component (C), are added to a vessel containing component (A). In such embodiments, components (B) and (C) may be first combined prior to the addition, or may be added to the vessel sequentially. In general, reference to the "reaction mixture" herein refers generally to a mixture comprising components (A), (B), and optionally (C) (e.g. as obtained by combining such components, as described above).

The method may further comprise agitating the reaction mixture. The agitating may enhance mixing and contacting together components (A), (B), and optionally (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction of the amino-functional compound (B) with the organosilicon compound (A) so as to form the branched organosilicon compound. Other conditions may be result-effective conditions for enhancing reaction yield or minimizing amount of a particular reaction by-product included within the reaction product along with the branched organosilicon compound.

In some embodiments, the reaction is carried out at the elevated temperature. The elevated temperature will be selected and controlled depending on the particular organosilicon compound (A) selected, the particular the amino-functional compound (B) selected, the particular carrier and/or solvent being utilized, if any, etc. Accordingly, the elevated temperature will be readily selected by one of skill in the art in view of the reaction conditions and parameters selected and the description herein. The elevated temperature is typically from greater than ambient temperature to 180° C., such as from 30 to 170, alternatively from 50 to 170, alternatively from 70 to 170, alternatively from 90 to 170, alternatively from 110 to 170, alternatively from 130 to 170, alternatively from 150 to 170, alternatively from 150 to 160, ° C.

It is to be appreciated that the elevated temperature may also differ from the ranges set forth above, or be more specific subsets thereof. For example, in particular embodiments, the elevated temperature is from 110 to 120, alternatively from 120 to 130, alternatively from 130 to 140, alternatively from 140 to 150, alternatively from 150 to 160° C. It is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A) and (B) to prepare the branched organosilicon compound is carried out is a function of scale, reaction parameters and conditions, selection of particular components, etc. In certain embodiments, the time during which the reaction is carried out is from greater than 0 to 48 hours, alternatively from 1 to 36 hours, alternatively from 6 to 36 hours, alternatively from 12 to 24 hours, after components (A) and (B) are combined (e.g. in the presence of component (C)).

In certain embodiments, the method further comprises isolating and/or purifying the branched organosilicon compound from the reaction product. As used herein, isolating the branched organosilicon compound is typically defined as increasing the relative concentration of the branched organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the branched organosilicon compound, e.g. in the reaction product) and/or removing the branched organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the branched organosilicon compound. It is to be appreciated that isolating may include, and thus may be referred to as, purifying the branched organosilicon compound. However, purifying the branched organosilicon compound may comprise alternative and/or additional techniques as compared to those utilized in isolating the branched organosilicon compound. Regardless of the particular technique(s) selected, isolation and/or purification of the branched organosilicon compound may be performed in sequence (i.e., in line) with the reaction itself, and thus may be automated. In other instances, purification may be a stand-alone procedure to which the reaction product comprising the branched organosilicon compound is subjected.

Reactive Compound (D)

In specific embodiments, the reaction of components (A) and (B), optionally in the presence of (C), prepares an inital branched organosilicon compound, and the method further comprises reacting the inital branched organosilicon compound with (D) a compound reactive with the initial branched organosilicon compound (the "reactive compound") to give the branched organosilicon compound. In such embodiments, the inital branched organosilicon compound typically has one of the following formulas (III) or (IV):

(III)

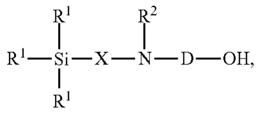

(IV)

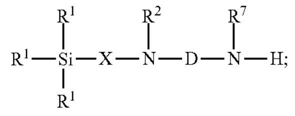

where each $R^1$, $R^2$, $R^7$, X, and D is as defined herein. One of skill in the art will readily appreciate that the inital branched organosilicon compounds of formula (III) are amino-alcohol functional, and the inital branched organosilicon compounds of formula (IV) are diamino-functional. In such embodiments, as will be best understood in view of the description of the reactive compound (D), it is the terminal alcohol or amine of the inital branched organosilicon compound that reacts with the reactive compound (D) to give the branched organosilicon compound. In particular, the reactive compound (D) comprises a functional group reactive with the terminal alcohol or amine of the inital branched organosilicon compound.

In general, the reactive compound (D) has the formula $Y^2$—C(O)$R^8$, where $R^8$ is a substituted or unsubstituted hydrocarbon group as described above, and $Y^2$ is an alkoxy group or a carboxy group, such that the reactive compound (D) comprises an ester or an anhydride group, respectively. For example, in some such embodiments, $R^8$ has the general formula —C($CH_2$)$R^9$, where $R^9$ is a substituted or unsubstituted hydrocarbyl group (e.g. an alkyl group) or H, such that the reactive compound (D) is an acrylic ester or acrylic anhydride (e.g. an alkyl acrylate ester, an alkyl alkylacrylic anhydride, etc.). In particular embodiments, $R^8$ has the general formula -$D^1$-Y, where $D^1$ is a divalent linking group as described above, and Y is a functional group comprising at least one O or N atom as described above. In some such embodiments, Y is a divalent functional group comprising at least one O or N atom. For example, in particular embodiments, $R^8$ has the general formula -$D^1$-Y—$R^{10}$, where $D^1$ and Y are as described above, and $R^{10}$ is a substituted or unsubstituted hydrocarbon group or H.

In specific embodiments, Y is $Y^2$, such that the reactive compound (D) is a cyclic compound having the formula:

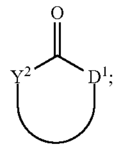

where $D^1$ and $Y^2$ are as defined above. In some such embodiments, the reactive compound (D) comprises, alternatively is, maleic anhydride, succinic anhydrice, or a combination thereof.

The reactive compound (D) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof.

In certain embodiments, the reactive compound (D) is utilized in the absence of a carrier vehicle. In some such embodiments, the reactive compound (D) is utilized absent water and carrier vehicles/volatiles reactive with the inital branched organosilicon compound and/or the reactive compound (D). For example, in certain embodiments, the method may comprise stripping the reactive compound (D) of volatiles and/or solvents (e.g. organic solvents, water, etc.). Techniques for stripping the reactive compound (D) are known in the art, and may include distillation, heating, applying reduced pressure/vacuum, azeotroping with solvents, utilizing molecular sieves, etc., and combinations thereof.

In certain embodiments, the method comprises utilizing more than one reactive compound (D), such as 2, 3, 4, or more reactive compounds (D). In such embodiments, each reactive compound (D) is independently selected, and may be the same or different from any other reactive compound (D).

The reactive compound (D) may be utilized in any amount, which will be selected by one of skill in the art, e.g. dependent upon the particular inital branched organosilicon compound and/or reactive compound (D) selected, the reaction parameters employed, the scale of the reaction (e.g. total amounts of the inital branched organosilicon compound and/or the reactive compound (D) to be reacted and/or the branched organosilicon compound to be prepared), etc.

The inital branched organosilicon compound and the reactive compound (D) are typically reacted in a molar ratio of from 1:1 to 1:1.5, alternatively from 1:1 to 1:1.4, alternatively from 1:1 to 1:1.3, alternatively from 1:1 to 1:1.2, alternatively from 1:1 to 1:1.1, alternatively 1:1. However, the relative amounts of the inital branched organosilicon compound and the reactive compound (D) utilized may vary, e.g. based upon the particular inital branched organosilicon compound selected, the particular the reactive compound (D) selected, the reaction parameters employed, etc. As will be understood by those of skill in the art in view of the description herein, the reaction of the inital branched organosilicon compound and the reactive compound (D) to prepare the branched organosilicon compound occurs at a theoretical maximum molar ratio of 1:1 (inital branched organosilicon compound):(reactive compound (D)). However, an excess of the one of the components is typically utilized to fully consume one of the compounds, e.g. to simplify purification of the reaction product formed, etc. For example, in certain embodiments, compound (D) is utilized in relative excess to maximize a conversion rate of the inital branched organosilicon compound to the branched organosilicon compound.

In certain embodiments, the inital branched organosilicon compound and the reactive compound (D) are reacted in a molar ratio of from 0.1 to 20 (inital branched organosilicon compound):(reactive compound (D)). For example, in certain embodiments, the inital branched organosilicon compound and the reactive compound (D) are reacted in a molar ratio of from 1:1 to 1:10, such as from 1:1.1 to 1:10, alternatively of from 1:1.5 to 1:10, alternatively of from 1:2 to 1:10, alternatively of from 1:2.5 to 1:10, alternatively of from 1:3 to 1:10, alternatively of from 1:4 to 1:10, alternatively of from 1:5 to 1:10, alternatively of from 1:6 to 1:10, (inital branched organosilicon compound):(reactive compound (D)). In some embodiments, the inital branched organosilicon compound and the reactive compound (D) are reacted in a molar ratio of from 1:1 to 20:1, such as from 1.1:1 to 20:1, alternatively of from 1.5:1 to 20:1, alternatively of from 2:1 to 20:1, alternatively of from 2.5:1 to 20:1, alternatively of from 3:1 to 20:1, alternatively of from 4:1 to 20:1, alternatively of from 5:1 to 20:1, alternatively of from 10:1 to 20:1, alternatively of from 15:1 to 20:1, (inital branched organosilicon compound):(reactive compound (D)). It will be appreciated that ratios outside of these ranges may be utilized as well. For example, in certain embodiments, the reactive compound (D) is utilized in a gross excess (e.g. in an amount of ≥10, alternatively ≥15, alternatively ≥20, times the molar amount of the inital branched organosilicon compound), such as when the reactive compound (D) is utilized as a carrier (i.e., a solvent, diluent, etc.) during the reaction.

In certain embodiments, the method further comprises isolating and/or purifying the initial branched organosilicon compound from the reaction product of components (A) and (B), e.g. prior to reaction of the initial branched organosilicon compound and the reactive compound (D). In such embodiments, isolating and/or purifying the initial branched organosilicon compound may utilize any technique, such as those described above with regard to isolating/purifying the branched organosilicon compound. However, in certain embodiments such isolation/purification is not performed, such that the reaction of the initial branched organosilicon compound and the reactive compound (D) is performed in sequence with the reaction of components (A) and (B) described above (e.g. without intervening isolation/purification of the initial branched organosilicon compound).

Composition & Use of Branched Organosilicon Compound

A composition is also provided. The composition includes the branched organosilicon compound (the “compound”) and is otherwise generally without limitation. As such, as will be appreciated from the description below, the composition can be of various forms, functions, uses, end applications, etc.

The compound may be present in the composition in various amounts. One of skill in the art can readily determine a suitable amount of the compound depending, for example, on the particular composition, compound, desired outcome(s), etc.

In various embodiments, the composition is further defined as at least one of: (i) an emulsion; (ii) an aqueous composition; (iii) a surfactant composition; (iv) a wetting composition; (v) an aqueous film-forming foam; (vi) a surface tension modifier; (vii) an antiblocking additive; (viii) an agricultural composition; (ix) a coating composition; (x) a paint composition; (xi) a surface treating composition; (xii) a film-forming composition; and (xiii) a cosmetic composition. One of skill in the art appreciates that certain compositions may overlap as to form and/or function. Reference to the composition and any one of these specific compositions, e.g. the emulsion, may be interchangeable in the description that follows.

The compound can be used for numerous applications. In various embodiments, the compound is used as at least one of a surfactant, a dispersant, a wetting agent, an antiblocking additive, a surface tension modifier, a surface treating agent, an additive for agricultural compositions, an additive for coatings, an additive for paints, a cosmetic ingredient, a siloxane modifier, and an aqueous film-forming foam ingredient. One of skill in the art appreciates that certain uses or applications may overlap as to function and/or desired outcome.

In the composition, the compound may be used alone, may be supplemented by at least one auxiliary component, or may act as an auxiliary to at least one other component, optionally in the presence of one of more additives. In various embodiments, the compound may be referred to as an agent, an additive, an adjuvant, an ingredient, or a modifier.

The compound may react with—or be inert with respect to—other components present in the composition. In compositions or applications where the composition or compound, contacts a surface or substrate, there may be bonding to the surface or substrate, with such bonding being mechanical/physical, chemical, or a combination thereof. For example, a surface may have functional groups that are reactive with the compound. Such functional groups may be inherent to the surface or may be imparted by one or more types of conventional surface treatment. Certain exemplary compositions and components thereof are described below.

It is to be appreciated that certain components or additives may be classified under different terms of art and just because a component or additive is classified under such a term does not mean that they are limited to that function. One or more of the additives can be present as any suitable weight percent (wt. %) of the composition, such as from 0.01 wt. % to 65 wt. %, alternatively from 0.05 wt. % to 35 wt. %, alternatively from 0.1 wt. % to 15 wt. %, alternatively from 0.5 wt. % to 5 wt. %, or alternatively 0.1 wt. % or less. One of skill in the art can readily determine a suitable amount of additive depending, for example, on the type of additive and the desired outcome. Certain optional additives are described in greater detail below.

In various embodiments, the composition comprises or is an emulsion. The emulsion is without limitation, and is generally selected from the group of silicone/oil-in-water (O/W) and water-in-oil/silicone (W/O) emulsions. The emulsion comprises a non-aqueous phase and an aqueous phase. Typically, the non-aqueous phase is a discontinuous phase in the emulsion, and the aqueous phase is a continuous phase. However, the non-aqueous phase may be the continuous phase, with the aqueous phase being the discontinuous phase, based on the relevant amounts of components therein, as described below.

The discontinuous phase generally forms particles in the continuous phase of the emulsion. The particles are liquid and may alternatively be referred to as droplets. The size of the particles is typically contingent on, for example, the selection of components therein and their amounts.

In various embodiments, the non-aqueous phase of the emulsion comprises the compound of this disclosure. In certain embodiments, the non-aqueous phase further comprises a carrier vehicle for the compound. The carrier vehicle may be selected from vehicles understood in the art, such as siloxane carrier vehicles, inorganic and organic solvents, etc. In other or further embodiments, the non-aqueous phase further comprises a surfactant, as described further below. Exemplary emulsions, compositions comprising emulsions, and films formed therewith, are described in WO2018145069A1.

Representative non-limiting examples of organic solvents include toluene, xylene, and similar aromatic hydrocarbons; hexane, heptane, isooctane, and similar linear or partially branched saturated hydrocarbons; cyclohexane and similar aliphatic hydrocarbons; low molecular weight alcohols such as methanol, ethanol, propanol, isopropanol and the like; low molecular weight ethers such as di(propyleneglycol) mono methyl ether, di(ethyleneglycol) butyl ether, di(ethyleneglycol) methyl ether, di(propyleneglycol) butyl ether, di(propyleneglycol) methyl ether acetate, di(propyleneglycol) propyl ether, ethylene glycol phenyl ether, propylene glycol butyl ether, 1-methoxy-2-propanol, 1-methoxy-2-propyl acetate, propylene glycol propyl ether, 1-phenoxy-2-propanol, tri(propyleneglycol) methyl ether and tri(propyleneglycol) butyl ether, and other like glycols.

The aqueous phase comprises water. The water may be from any source and may optionally be purified, e.g. through filtration, distillation, reverse-osmosis techniques, etc.

In many embodiments, the emulsion further comprises a surfactant. The surfactant may alternatively be referred to as an emulsifier and generally serves to emulsify the non-aqueous phase in the aqueous phase of the emulsion. The surfactant may be any surfactant suitable for preparing the emulsion with the non-aqueous phase and the aqueous phase.

For example, the surfactant may comprise one or more anionic, cationic, nonionic, and/or amphoteric surfactants, organomodified silicones such as dimethicone copolyol, oxyethylenated and/or oxypropylenated ethers of glycerol, oxyethylenated and/or oxypropylenated ethers of fatty alcohols such as ceteareth-30, $C_{12-15}$ pareth-7, fatty acid esters of polyethylene glycol such as PEG-50 stearate, PEG-40 monostearate, saccharide esters and ethers such as sucrose stearate, sucrose cocoate and sorbitan stearate, and mixtures thereof, phosphoric esters and salts thereof such as DEA oleth-10 phosphate, sulphosuccinates such as disodium PEG-5 citrate lauryl sulphosuccinate and disodium ricinoleamido MEA sulphosuccinate, alkyl ether sulphates such as sodium lauryl ether sulphate, isethionates, betaine derivatives, and mixtures thereof.

In certain embodiments, the surfactant comprises the anionic surfactant. Anionic surfactants include, for example, carboxylates (sodium 2-(2-hydroxyalkyloxy)acetate)), amino acid derivatives (N-acylglutamates, N-acylglycinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate and triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid, and mixtures thereof.

In these or other embodiments, the surfactant comprises the cationic surfactant. Cationic surfactants include, for example, various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such asundecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, and hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmitylhydroxyethylammonium methosulfate, amide derivatives of amino alcohols such as beta-hydroxylethylstearylamide, amine salts of long chain fatty acids, and mixtures thereof.

In these or other embodiments, the surfactant comprises the nonionic surfactant. Nonionic surfactants include, for example, polyoxyethylene alkyl ethers (such as, lauryl, cetyl, stearyl or octyl), polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, polyoxyalkylene-substituted silicones (rake or ABn types), silicone alkanolamides, silicone esters, silicone glycosides, dimethicone copolyols, fatty acid esters of polyols, for instance sorbitol and glyceryl mono-, di-, tri- and sesquioleates and stearates, glyceryl and polyethylene glycol laurates; fatty acid esters of polyethylene glycol (such as polyethylene glycol monostearates and monolaurates), polyoxyethylenated fatty acid esters (such as stearates and oleates) of sorbitol, and mixtures thereof.

In these or other embodiments, the surfactant comprises the amophoteric surfactant. Amphoteric surfactants, include, for example, amino acid surfactants, betaine acid surfactants, trimethylnonyl polyethylene glycol ethers and polyethylene glycol ether alcohols containing linear alkyl groups having from 11 to 15 carbon atoms, such as 2,6,8-trimethyl-4-nonyloxypolyethylene oxyethanol (6 EO) (sold as Tergitol®TMN-6 by OSi Specialties, A Witco Company, Endicott, N.Y.), 2,6,8-trimethyl-4-nonyloxypolyethylene oxyethanol (10 EO) (sold as Tergitol®TMN-10 by OSi Specialties, A Witco Company, Endicott, N.Y.), alkylene-oxypolyethylene oxyethanol ($C_{11-15}$ secondary alkyl, 9 EO) (sold as Tergitol®15-S-9 by OSi Specialties, A Witco Company, Endicott, NY), alkylene-oxypolyethylene oxyethanol ($C_{11-15}$ secondary alkyl, 15 EO) (sold as Tergitol®15-S-15 by OSi Specialties, A Witco Company, Endicott, N.Y.), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines (available from Armak Company, Chicago, Ilinois under the tradenames Ethoquad, Ethomeen, or Arquad), polyoxyalkylene glycol modified polysiloxanes, N-alkylamido-betaines and derivatives thereof, proteins and derivatives thereof, glycine derivatives, sultaines, alkyl polyaminocarboxylates and alkylamphoacetates, and mixtures thereof. These surfactants may also be obtained from other suppliers under different tradenames.

The surfactant may be included in the emulsion at concentrations effective for emulsifying the non-aqueous phase in the aqueous phase (or vice versa). Such concentrations range from greater than 0 to 10, alternatively from 0.3 to 5, weight percent based on the total weight of the emulsion. The surfactant, or combination of surfactants, may be present in the aqueous phase of the emulsion, the non-aqueous phase of the emulsion, an interface of the aqueous and non-aqueous phases, or combinations thereof.

The emulsion may further comprise one or more various optional additives, such as coupling agents, antistatic agents, ultraviolet (UV) absorbers, plasticizers, leveling agents, preservatives, surface active materials (surfactants or detergents or emulsifiers), foam boosters, deposition agents, thickeners, water phase stabilizing agents, fillers, suspending agents, biocides, freeze/thaw additives, anti-freeze agents, viscosity modifiers, foam control agents, dyestuff (e.g. pigments), binders and combinations thereof.

Alternatively or in addition to the above, the emulsion may further comprise various additive compounds for improving properties of the film formed therefrom. Examples of additive compounds are silanes, such as tetrakis(dimethylamine)silane, tetraethylorthosilicate, glycidoxypropyltrimethoxysilane, triethylsilane, isobutyltrimethoxysilane; and siloxanes, such as heptamethyltrisiloxane, tetramethyldisloxane, etc.

In some embodiments, the emulsion is a coating composition, or may be formulated into a coating composition. Such coating compositions are typically utilized to provide a continuous protective coating on a substrate by applying the coating composition to a surface of the substrate. Examples of such substrates include organic or inorganic components, and may include household materials such as leathers, papers, woods, metals, plastics, fabrics, paints, and the like. The coating compositions may also be suitable for use in other applications as well, e.g. as a protective and/or decorative coating, as a component in a paint, etc.

In various embodiments, the compound can be used as additives for epoxy coatings. Numerous epoxy coatings are understood in the art, including those described in U.S. Pat. No. 8,722,148 and US20060205861.

In various embodiments, the composition comprises the emulsion and an organic binder. The emulsion can be formed in situ in the composition, or the emulsion can be first prepared and then combined with the organic binder, along with any other optional components, to give the composition. In certain embodiments, the composition is formed by combining the emulsion and the organic binder, along with any optional components. The emulsion typically is present in the composition, i.e., forming the composition with the emulsion doesn't destroy the emulsion.

The organic binder is not limited and is generally selected based on end use applications of the composition. While exemplary examples are set forth below, any organic binder may be utilized in the composition. The organic binder may be reactive or non-reactive, and may be a thermoplastic and/or thermoset. Typically, the organic binder is an organic polymer and/or resin.

In certain embodiments, the organic binder comprises a natural latex. In these or other embodiments, the organic binder comprises a synthetic latex. The organic binder may also be a combination of natural and synthetic latex. For example, the organic binder is typically a natural and/or synthetic latex when the composition is utilized to prepare films or paints. Natural and synthetic latexes are known in the art. For example, depending on a selection of the organic binder, the composition may be utilized as a paint, e.g. a heat resistant paint, which may be solventless. The paint may be utilized in insulation applications, anti-fouling applications, architectural applications, commercial/industrial or residential applications, protective applications, leather applications, textile applications, etc.

Specific examples of organic binders include, but are not limited to, polyolefins, acrylic polymers, polyvinyl acetate, polyvinyl chloride, styrenes (e.g. styrene-butadiene rubber), acrylonitrile-butadienes, epoxy resins, phenolics, polyesters, polyvinylbutyral, phenoxys, polyureas, cellulosic resins, polyurethanes, polyamides, polyethers, alkyds, silicones, acrylonitriles, etc. The organic binder may comprise a combination of such organic binders, or copolymers or terpolymers including one or more such organic binders.

The content of the organic binder in the composition may vary on a number of factors, such as its selection, the type and amount of the emulsion present in the composition, end use applications of the composition, etc. Increased loadings of the organic binder generally result in films having greater hardness and other increased physical properties. In certain embodiments, the composition comprises the binder in an amount of from greater than 0 to less than 100, alternatively from greater than 0 to 50, alternatively from 0.1 to 40, alternatively from 5 to 15, wt. % based on the total weight of the composition.

The organic binder may be dispersed or disposed in a carrier vehicle. The carrier vehicle may be any suitable carrier vehicle, which typically solubilizes the organic binder. The carrier vehicle is typically a function of the organic binder utilized. The carrier vehicle may be water such that the composition as a whole is water-based, or may be a solvent other than water, e.g. an organic solvent. In certain embodiments, like the emulsion, the composition is substantially free from water. Substantially free from water is defined with respect to the emulsion.

In some embodiments the composition further comprises one or more optional components. The composition may comprise any of the optional components described above with respect to the emulsion. These optional components may be included in the composition from being present in the emulsion, may be incorporated into the composition independent from the emulsion, or both. Specific examples of optional components include, but are not limited to, colorants, coalescing aids, surfactants, thickeners, defoamers, compatibilizers, UV stabilizers, antioxidants, biocides, flame retardants, etc., Some of these optional components may be present in the emulsion, as described above, and thus included in the composition, or one or more of these optional components may be incorporated when forming the composition. Any of the optional components described above relative to the emulsion may also be present in the composition, either through introduction from the emulsion or from inclusion of an additional amount of the particular component. By way of example, the composition may comprise a catalyst, which may be the same as or different from any catalyst that may be present in the emulsion.

In certain embodiments, the composition further comprises one or more colorants, such as pigments, dyes, and the like. Such colorants can be organic or inorganic, synthetic or natural. Examples of colorants are set forth above regarding the emulsion. The emulsion and the composition itself may include different colorants which are independently selected. Additional examples of suitable colorants include cadmium yellow, cadmium red, cadmium green, cadmium orange, carbon black (including vine black, lamp black), ivory black (bone char), chrome yellow, chrome green, cobalt violet, cobalt blue, cerulean blue, aureolin (cobalt yellow), Azurite, Han purple, Han blue, Egyptian blue, Malachite, Paris green, Phthalocyanine Blue BN, Phthalocyanine Green G, verdigris, viridian, sanguine, caput mortuum, oxide red, red ochre, Venetian red, Prussian blue, yellow ochre, raw sienna, burnt sienna, raw umber, burnt umber, Cremnitz white, Naples yellow, vermilion titanium yellow, titanium beige, titanium white ($TiO_2$), titanium black, ultramarine, ultramarine green shade, zinc white, zinc ferrite, alizarin (synthesized or natural), alizarin crimson (synthesized or natural), gamboge, cochineal red, rose madder, indigo, Indian yellow, Tyrian purple, quinacridone, magenta, phthalo green, phthalo blue, pigment red 170, or any combinations thereof.

In particular embodiments, the composition further comprises a coalescing aid. Suitable coalescing aids include any compound that decreases the minimum film-formation temperature of the organic binder, when the organic binder indeed forms a film, and/or increases the rate of solid film formation from the organic binder when any carrier vehicle or water is removed from the composition. Examples of suitable coalescing aids include glycol ethers, 2,2,4-trimethyl-1,3-pentanediol isobutyrate, and combinations thereof In certain embodiments, the composition comprises a surfactant. The surfactant may be the same as or different from any surfactant utilized in the emulsion, examples of which are set forth above.

Thickeners (or rheology modifiers) may also be included in the composition to achieve desired viscosity and flow properties. Depending on their selection, as the selection of the organic binder, the thickeners may function by, for example, forming multiple hydrogen bonds with the organic binder, thereby causing chain entanglement, looping and/or swelling which results in volume restriction. In certain embodiments, thickeners such as cellulose derivatives including hydroxyethyl cellulose, methyl cellulose and carboxymethyl cellulose, may be utilized.

In some embodiments, the composition includes a defoamer. The defoamer may be any suitable chemical additive that reduces and hinders the formation of foam in the composition. Defoamers are known in the art and are typically selected based on other components present in the composition.

When the composition comprises the compatibilizer, the compatibilizer may be any compound or component which modifies, alternatively improves, the wetting of the components in the composition. Examples of such compatibilizers include titanium alcoholates, esters of phosphoric, phosphorous, phosphonic, and silicic acids, metallic salts and esters of aliphatic, aromatic, and cycloaliphatic acids, ethylene/acrylic or methacrylic acids, ethylene/esters of acrylic or methacrylic acid, ethylene/vinyl acetate resins, styrene/maleic anhydride resins or esters thereof, acrylonitrilebutadiene styrene resins, methacrylate/butadiene styrene resins (MBS), styrene acrylonitrile resins (SAN), and butadieneacrylonitrile copolymers. Alternatively or in addition, the compatibilizer may comprise a silane, e.g. a hydrocarbonoxysilane such as an alkoxysilane, a combination of an alkoxysilane and a hydroxy-functional polyorganosiloxane, an aminofunctional silane, or a combination thereof. The silane may include any functional group, which may be an adhesion-promoting group, such as amino, epoxy, mercapto and/or acrylate groups. Combinations of functional groups may be utilized, e.g. the (D) compatibilizer may comprise an epoxy-functional alkoxysilane. Suitable epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. Examples of suitable epoxy-functional alkoxysilanes include 3-glycidoxypropyltrim ethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Aminofunctional silanes, such as an aminofunctional alkoxysilanes, may have various amino groups, as understood in the art. Other examples of compatibilizers include modified polyethylene and modified polypropylene, which are obtained by modifying polyethylene and polypropylene, respectively, using a reactive group, including polar monomers such as maleic anhydride or esters, acrylic or methacrylic acid or esters, vinylacetate, acrylonitrile, and styrene.

Specific examples of UV stabilizers include phenol, 2-(2H-benzotriazol-2-yl)-6-dodecyl-4-methyl-, branched and linear (TINUVIN® 571). Additional examples of suitable UV stabilizers include bis(1,2,2,6,6-pentamethyl-4-piperidyl) sebacate; methyl I,2,2,6,6-pentamethyl-4-piperidyl/sebacate; and a combination thereof (TINUVIN® 272). These and other TINUVINO additives, such as TINUVIN® 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. An example of an oligomeric antioxidant stabilizer (specifically, hindered amine light stabilizer (HALS)) is Ciba TINUVIN® 622, which is a dimethylester of butanedioic acid copolymerized with 4-hydroxy-2,2,6,6-tetramethyl-1-piperidine ethanol.

If utilized, the antioxidant may be any antioxidant known in the art. Specific examples thereof include phenolic antioxidants and combinations of phenolic antioxidants with stabilizers. Phenolic antioxidants include fully sterically hindered phenols and partially hindered phenols; and sterically hindered amines such as tetramethyl-piperidine derivatives. Suitable phenolic antioxidants include vitamin E and IRGANOX® 1010 from Ciba Specialty Chemicals, U.S.A. IRGANOX® 1010 comprises pentaerythritol tetrakis(3-(3,5-di-t-butyl-4-hydroxyphenyl)propionate). Additional examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *Camellia sinensis* oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (*Melaleuca aftemifolia*) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof.

Biocides may be exemplified by fungicides, herbicides, pesticides, antimicrobial agents, or a combination thereof.

Specific examples of fungicides include N-substituted benzimidazole carbamate, benzimidazolyl carbamate such as methyl 2-benzimidazolylcarbamate, ethyl 2-benzimidazolylcarbamate, isopropyl 2-benzimidazolylcarbamate, methyl N-{2-[I-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[I-(N-methylcarbamoyl)benzimidazolyl]}carbamate, methyl N-{2-[I-(N-methylcarbamoyl)-6-methylbenzimidazolyl]}carbamate, methyl N-{2-[I-(N-methylcarbamoyl)-5-methylbenzimidazolyl]}carbamate, ethyl N-{2-[I-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[I-(N-methylcarbamoyl)-6-methylbenzimidazolyl]}carbamate, isopropyl N-{2-[I-(N,N-dimethylcarbamoyl)benzimidazolyl]}carbamate, isopropyl N-{2-[I-(N-methylcarbamoyl)benzimidazolyl]}carbamate, methyl N-{2-[I-(N-prop ylcarbamoyl)benzimidazolyl]}carbamate, methyl N-{2-[I-(N-butylcarbamoyl)benzimidazolyl]}carbamate, methoxyethyl N-{2-[I-(N-prop ylcarbamoyl)benzimidazolyl]}carbamate, methoxyethyl N-{2-[I-(N-butylcarbamoyl)benzimidazolyl]}carbamate, ethoxyethyl N-{2-[I-(N-prop ylcarbamoyl)benzimidazolyl]}carbamate, ethoxyethyl N-{2-[I-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[I-(N-butylcarbamoyloxy)benzoimidazolyl]}carbamate, ethoxyethyl N-{2-[I-(N-prop ylcarbamoyl)benzimidazolyl]}carbamate, ethoxyethyl N-{2-[I-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[I-(N,N-dimethylcarbamoyl)-6-nitrobenzimidazolyl]}carbamate; 10,10'-oxybisphenoxarsine (which has trade name Vinyzene, OB PA), di-iodomethyl-para-tolylsulfone, benzothiophene-2-cyclohexylcarboxamide-S,S-dioxide, N-(fluordichloridemethylthio) phthalimide (which has trade names Fluor-Folper, and Preventol A3); methyl-benzimideazol-2-ylcarbamate (which has trade names Carbendazim, and Preventol BCM), zinc-bis (2-pyridylthio-I-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or triazolyl-compounds, such as tebuconazol in combination with zeolites containing silver.

Alternatively, the biocide may comprise a boron containing material, e.g., boric anhydride, borax, or disodium octaborate tetrahydrate; which may function as a pesticide, fungicide, and/or flame retardant.

Specific examples of suitable flame retardants include carbon black, hydrated aluminum hydroxide, and silicates such as wollastonite, platinum and platinum compounds. Alternatively, the flame retardant, if utilized, may be selected from halogen based flame-retardants such as decabromodiphenyloxide, octabromodiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy) ethane, bis-(pentabromophenoxy) ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene and PVC. Alternatively, the flame retardant, if utilized, may be selected from phosphorus based flame-retardants such as (2,3-dibromopropyl)-phosphate, phosphorus, cyclic phosphates, triaryl phosphate, bis-melaminium pentate, pentaerythritol bicyclic phosphate, dimethyl methyl phosphate, phosphine oxide diol, triphenyl phosphate, tris-(2-chloroethyl) phosphate, phosphate esters such as tricreyl, trixylenyl, isodecyl diphenyl, ethylhexyl diphenyl, phosphate salts of various amines such as ammonium phosphate, trioctyl, tributyl or tris-butoxyethyl phosphate ester. Other suitable flame retardants may include tetraalkyl lead compounds such as tetraethyl lead, iron pentacarbonyl, manganese methyl cyclopentadienyl tricarbonyl, melamine and derivatives such as melamine salts, guanidine, dicyandiamide, ammonium sulphamate, alumina trihydrate, and magnesium hydroxide alumina trihydrate.

Aqueous compositions include any composition that includes water as a component, generally as a primary or majority component (e.g. as a solvent, carrier or medium). In these embodiments, the aqueous composition further comprises the compound of this disclosure.

As understood in the art, surfactants are compounds that lower the surface tension (or interfacial tension) between two liquids, between a gas and a liquid, or between a liquid and a solid. Surfactants may act as detergents, wetting agents, emulsifiers, foaming agents, and dispersants. Surfactants can serve as cleaning, wetting, dispersing, emulsifying, foaming and anti-foaming agents in many practical applications and products, including, but not limited to, detergents, fabric softeners, emulsions, soaps, paints, adhesives, inks, anti-fogs, ski waxes, snowboard wax, deinking of recycled papers, in flotation, washing and enzymatic processes, laxatives, etc. Agrochemical formulations such as some herbicides, insecticides, biocides (sanitizers), and spermicides may also include one or more surfactants. Personal care products such as cosmetics, shampoos, shower gel, hair conditioners (after shampoo), and toothpastes often include one or more surfactants.

The surfactant composition comprises the compound of this disclosure. In certain embodiments, the surfactant composition further comprises one or more additives understood in the art, such as water and/or other vehicles, one or more conventional surfactants, etc. One of skill in the art appreciates that surfactant compositions may also be referred to as wetting compositions, surface tension modifiers, or dispersant compositions. In some applications, there may be slight nuances as to differences in form, function, and/or end application of such compositions.

In other embodiments, the compound itself is a surfactant. In these embodiments, the compound may be referred to as a dispersant, a wetting agent, or a surface tension modifier.

In various embodiments, the composition is selected from the group consisting of film-forming compositions, including foaming and substantially non-foaming compositions, aqueous and non-aqueous compositions, and combinations thereof. Certain films are described below. The composition may be curable, partially curable, or may not cure. In embodiments where the composition is at least partially curable to curable, the composition can change form, such as going from a liquid to a more viscous liquid, a gel, a semi-solid, or a solid.

In various embodiments, the composition is useful as an antiblocking (or anti-blocking) additive (or agent). In these embodiments, the composition may also provide scratch resistance and a low coefficient of friction (COF). In certain embodiments, the compound itself is the antiblocking additive.

Antiblocking agents are often used in or for films, e.g. in polyolefin films, to improve the slippage among individual molecules of the antiblocking agent and are important ingredients for the post-processing conversion (cutting, folding, welding etc.) of such films. Blocking is a common problem encountered by manufacturers of films and coatings. Blocking is the adhesion of two adjacent layers of film. It is a problem most associated with polyethylene and polypropylene films (either blown or cast) and to a lesser extent in extrusion coated or laminated products. Blocking of adjacent film layers occurs due to the presence of van der Waals forces between the amorphous regions of the polymer. These forces increase with reduced distance between the two layers, thereby increasing blocking when two layers are pressed together (e.g. binding onto a take up roll or stacking of finished, converted films). Another possible reason for blocking is the presence of low molecular weight species (such as oligomers) which tend to migrate to the surface of the film.

An effective method for combating these handling problems is to add an antiblocking additive. An antiblocking additive present in the resin microscopically protrudes from the film surface. This creates asperities ("little bumps") which help to minimize the film-to-film surface contact, increasing the distance between the two layers, thereby minimizing blocking.

The blocking between adjacent layers results in increased friction and the addition of an antiblocking agent generally contributes to a reduction in the film-to-film COF. COF is a measure of the relative difficulty with which one surface will slide over an adjoining surface. The greater the resistance to sliding, the higher the COF value (e.g. "low-slip" or "no-slip" films, sometimes referred to as "high COF" films).

In various embodiments, the composition is an agricultural composition comprising the compound as an additive. Numerous types of compositions for facilitating agriculture are understood in the art, including those that promote plant grown, control or prevent weeds, control or prevent varmints and insects, etc. Whether using a plant growth regulator or a genetically altered plant, any number of agronomically suitable additives, adjuvants and/or phytocatalysts are applied to the plants to support or enhance plant growth, including: fertilizers containing elements such as nitrogen, phosphorus, potassium, elevated carbon dioxide, hydrogen peroxide, iron and manganese; secondary nutrients such as sources of sulfur, calcium, and magnesium; micronutrients, such as boron, cobalt, copper, molybdenum, zinc, nickel; water soluble carbohydrates such as sucrose, fructose and glucose; and various alkyl glucosides.

In various embodiments, the composition includes at least one pesticide. The term pesticide is understood to encompass herbicides, insecticides, acaricides, nematicides, ectoparasiticides, fungicides and plant growth regulators. The composition is not limited in this regard.

Examples of classes of compounds that have herbicidal activity include imidazolinones such as imazaquin, sulfonylureas such as chlorimuron-ethyl, triazolopyrimidine sulfonamides such as flumetsulam, aryloxyphenoxy propionates such as quizalofop ethyl, aryl ureas such as isoproturon and chlorotoluron, triazines such as atrazine and simazine, aryl carboxylic acids such as picloram, aryloxy alkanoic acids such as MCPA, chloroacetanilides such as metazachlor, dintroanilines such as oryzalin, pyrazoles such as pyrazolynate and diphenyl ethers such as bifenox. Examples of classes of compounds that have insecticidal activity include benzoyl ureas such as hexaflumuron, diacylhydrazines such as tebufenozide, carbamates such as carbofuran, pyrethroids such as cypermethrin, organophosphates such as phosmet, triazoles, and natural products such as spinosyns.

Examples of classes of compounds that have fungicidal activity include morpholines such as dimethomorph, phenylamides such as benalaxyl, azoles such as hexaconazole, strobilurins such as azoxystrobin, phthalonitriles such as chlorothalonil and phenoxyquinolines such as quinoxyfen.

Examples of insecticides/acaricides are benthiocarb, diflubenzuron, teflubenzuron, lufenuron, diafenthiuron or pyrethroide such as bifenthrin, bioallethrin, tau-fluvalinate, resmethrin, permethrin, cypermethrin, cyfluthrin, cyhalothrin, deltamethrin, tefluthrin or tetramethrin; furtheron pymetrozin, thiocyclam, fenoxycarb, methopren, abamectin and emamectin.

In various embodiments, the compound can be used for treatment of particles, for example, as intermediates to treat metal oxide particle surfaces. The particles can be of various sizes and particle size distributions, including nano- and micro-sized.

The metal oxide particles can be any suitable metal oxide particles. Suitable metal oxide particles include, for example, aluminum oxide, titanium oxide, silica, tin oxide, magnesium oxide, zinc oxide, strontium oxide particles, mixtures thereof, and co-oxides thereof.

The particles may be electrically and/or thermally conductive or non-conductive. In certain embodiments, the particles are classified as electrically conductive filler, which can be a metal or a conductive non-metal; or metal or non-metal particles having an outer surface of a metal, with the outer surface metal being a noble metal such as silver, gold, platinum, palladium, and alloys thereof, or a base metal such as nickel, aluminum, copper, or steel. The particles can also have an outer surface of a metal with a core of particles consisting of copper, solid glass, hollow glass, mica, nickel, ceramic fiber or polymeric such as polystyrene and polymethylmethacrylate.

In certain embodiments, the particles are classified as thermally conductive filler, which can be a metal particle, metal oxide particle, thermally conductive non-metal powder, or combinations thereof. The thermally conductive filler can be aluminum, copper, gold, nickel, silver, alumina, magnesium oxide, beryllium oxide, chromium oxide, titanium oxide, zinc oxide, barium titanate, diamond, graphite, carbon or silicon nano-sized particles, boron nitride, aluminum nitride, boron carbide, titanium carbide, silicon carbide, and tungsten carbide.

Examples of mineral fillers or pigments which can be treated include titanium dioxide, aluminium trihydroxide (also called ATH), magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, ceramic or glass beads, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulphide or wollastonite.

Other fillers which may be treated include natural fibres such as wood flour, wood fibres, cotton fibres or agricultural fibres such as wheat straw, hemp, flax, kenaf, kapok, jute, ramie, sisal, henequen, corn fibre or coir, nut shells or rice hulls, lignin, starch, or cellulose and cellulose-containing products, or certain synthetic fibres such as aramid fibres, nylon fibres, cotton fibres or glass fibres, or plastic microspheres of polytetrafluoroethylene or polyethylene and the invention includes treatment of such fillers. The filler can be a solid organic pigment such as those incorporating azo, indigoid, triphenylmethane, anthraquinone, hydroquinone or xanthine dyes, or a solid organic flame retardant such as polychlorobiphenyl or decabromodiphenyl oxide or a phosphorus-containing flame retardant.

In various embodiments, the compound can be used to modify a siloxane or composition comprising at least one siloxane. The modification may be direct or indirect, such as in stances where the compound may react with the siloxane. Additional embodiments of the composition are described below.

The composition may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the composition includes at least one filler comprising hollow particles, e.g. hollow spheres. Such fillers can be useful for contributing to porosity and/or overall void fraction of the foam. In certain embodiments, some fillers can be utilized to tune the thixotropic property of the composition.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyi disilazane or short chain siloxane diols. Generally the surface treatment renders the filler(s) hydrophobic and therefore easier to handle and obtain a homogeneous mixture with the other components in the composition. Silanes such as $R^5_eSi(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1, 2 or 3, may also be utilized as the treating agent for fillers. In certain embodiments, the compound can used as a treating agent as described above, optionally in combination with one or more conventional treating agents.

In various embodiments, the composition further comprises a reaction inhibitor. For example, an alkyne alcohol such as 2-methyl-3-butyn-2-ol, 3,5-dimethyl-1-hexyn-3-ol, or 2-phenyl-3-butyn-2-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole may be incorporated as an optional component in the composition.

In various embodiments, the composition further comprises a thixotropic agent. Suitable thixotropic agents include rheological agents, specific examples of such agents may be found in U.S. Pub. Nos. 2018/0066115 A1 and 2018/0208797 A1.

In various embodiments, the composition further comprises an adhesion-imparting agent. The adhesion-imparting agent can improve adhesion of the foam to a base material being contacted during curing, e.g. the second surface 36. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl) ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

The adhesion-imparting agent, e.g. the organosilicon compound, generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxy group and at least one silicon-bonded alkenyl group in the molecule; and methyl polysilicate, ethyl polysilicate, and epoxy group-containing ethyl polysilicate.

In various embodiments, the composition includes at least one blowing agent. If utilized, the blowing agent can be selected from the group of chemical blowing agents, physical blowing agents, and combinations thereof. The amount of blowing agent utilized can vary depending on the desired outcome. For example, the amount of blowing agent can be varied to tailor final foam density and foam rise profile.

The composition can include carrier vehicles (or diluents) include silicones, both linear and cyclic, organic oils, organic solvents and mixtures of these. Specific examples of solvents may be found in U.S. Pat. No. 6,200,581. The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 $mm^2$/sec, such as hexamethylcyclotrisiloxane, octamethylcyclotetrasiloxane, ecamethylcyclopentasiloxane, dodecamethylcyclohexasiloxane, octamethyltrisiloxane, decamethyltetrasiloxane, dodecamethylpentasiloxane, tetradecamethylhexasiloxane, exadeamethylheptasiloxane, heptamethyl-3-{(trimethylsilyl)oxy)}trisiloxane, hexamethyl-3,3,bis{(trimethylsilyl) oxy}trisiloxane pentamethyl{(trimethylsilyl) oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

In some embodiments, the composition comprises one or more additional components, such as a rheology modifier, a polar organic solvent, a thickener, an inorganic salt (e.g. calcium chloride), a personal care active/ingredient, a fragrance, or combinations thereof. Typically, the one or more additional components are selected based on a desired use of the composition. For example, in some embodiments the composition is formulated for use as a personal care composition and further comprises a personal care ingredient. The specific personal care ingredient, or a mixture of specific personal care ingredients, may be selected based on the type of personal care composition the composition is being formulated as. In these embodiments, the personal care ingredient may be a liquid, a solid, an encapsulated liquid, etc. Various examples of the personal care ingredient are described below. Any of these personal care ingredients, or a combination of two or more different personal care ingredients, may be utilized as the personal care ingredient. For clarity and consistency, "the personal care ingredient" encompasses embodiments where the composition includes but one or two or more personal care ingredients.

In specific embodiments, the personal care ingredient is an antiperspirant and/or deodorant (AP/DEO) agent. In these embodiments, the composition may be referred to as an antiperspirant and/or deodorant (AP/DEO) composition. Examples of antiperspirant agents and deodorant agents include aluminum chloride, aluminum zirconium tetrachlorohydrex GLY, aluminum zirconium tetrachlorohydrex PEG, aluminum chlorohydrex, aluminum zirconium tetrachlorohydrex PG, aluminum chlorohydrex PEG, aluminum zirconium trichlorohydrate, aluminum chlorohydrex PG, aluminum zirconium trichlorohydrex GLY, hexachlorophene, benzalkonium chloride, aluminum sesquichlorohydrate, sodium bicarbonate, aluminum sesquichlorohydrex PEG, chlorophyllin-copper complex, triclosan, aluminum zirconium octachlorohydrate, zinc ricinoleate, and mixtures thereof.

In certain embodiments, the personal care ingredient comprises a skin care ingredient. If utilized to prepare the composition, the skin care ingredient is typically selected from water phase stabilizing agents, cosmetic biocides, conditioning agents (which may be silicone, cationic, hydrophobic, etc.), emollients, moisturizers, colorants, dyes, ultraviolet (UV) absorbers, sunscreen agents, antioxidants, fragrances, antimicrobial agents, antibacterial agents, antifungal agents, antiaging actives, anti-acne agents, skin-lightening agents, pigments, preservatives, pH controlling agents, electrolytes, chelating agents, plant extracts, botanical extracts, sebum absorbents, sebum control agents, vitamins, waxes, surfactants, detergents, emulsifiers, thickeners, propellant gases, skin protectants, film forming polymers, light scattering agents, and combinations thereof. In some of these embodiments, the composition may be referred to as a skin care composition, a cosmetic composition, a sunscreen, a shower gel, a soap, a hydrogel, a cream, a lotion, a balm, foundation, lipstick, eyeliner, a cuticle coat, a blush, etc., based on the particular personal care ingredients utilized. Various species of such skin care ingredients are set forth below, with similar and alternative species known by one of ordinary skill in the art.

Examples of emollients include volatile or non-volatile silicone oils; silicone resins such as polypropylsilsesquioxane and phenyl trimethicone; silicone elastomers such as dimethicone crosspolymer; alkylmethylsiloxanes such as $C_{30-45}$ alkyl methicone; volatile or non-volatile hydrocarbon compounds, such as squalene, paraffin oils, petrolatum oils and naphthalene oils; hydrogenated or partially hydrogenated polyisobutene; isoeicosane; squalane; isoparaffin; isododecane; isodecane or isohexa-decane; branched $C_8$-$C_{16}$ esters; isohexyl neopentanoate; ester oils such as isononyl isononanoate, cetostearyl octanoate, isopropyl myristate, palmitate derivatives (e.g. dextrin palmitate), stearates derivatives, diisostearyl malate, isostearyl isostearate and the heptanoates, octanoates, decanoates or ricinoleates of alcohols or of polyalcohols, or mixtures thereof; hydrocarbon oils of plant origin, such as wheatgerm, sunflower, grapeseed, castor, shea, avocado, olive, soybean, sweet almond, palm, rapeseed, cotton seed, hazelnut, macadamia, jojoba, blackcurrant, evening primrose; or triglycerides of caprylic/capric acids; higher fatty acids, such as oleic acid, linoleic acid or linolenic acid, and mixtures thereof.

Examples of waxes include hydrocarbon waxes such as beeswax, lanolin wax, rice wax, carnauba wax, candelilla wax, microcrystalline waxes, paraffins, ozokerite, polyethylene waxes, synthetic wax, ceresin, lanolin, lanolin derivatives, cocoa butter, shellac wax, bran wax, capok wax, sugar cane wax, montan wax, whale wax, bayberry wax, silicone waxes (e.g. polymethylsiloxane alkyls, alkoxys and/or esters, $C_{30-45}$ alkyldimethylsilyl polypropylsilsesquioxane), stearyl dimethicone, alkylmethylsiloxanes including long-chain alkyl groups in alkylmethylsiloxy units, and mixtures thereof.

Examples of moisturizers include lower molecular weight aliphatic diols such as propylene glycol and butylene glycol; polyols such as glycerine and sorbitol; and polyoxyethylene polymers such as polyethylene glycol 200; hyaluronic acid and its derivatives, and mixtures thereof.

Examples of thickeners include acrylamide copolymers, acrylate copolymers and salts thereof (such as sodium polyacrylate), xanthan gum and derivatives, cellulose gum and cellulose derivatives (such as methylcellulose, methylhydroxypropylcellulose, hydroxyethylcellulose, hydroxypropylcellulose, polypropylhydroxyethylcellulose), starch and starch derivatives (such as hydroxyethylamylose and starch amylase), polyoxyethylene, carbomer, alginates (such as sodium alginate), arabic gum, cassia gum, carob gum, scleroglucan gum, gellan gum, rhamsan gum, karaya gum, carrageenan gum, guar gum and guar gum derivatives, cocamide derivatives (including cocamidopropyl betaine and cocamide MIPA), alkyl alcohols (such as cetearyl alcohol, stearyl alcohol, and other fatty alcohols), gelatin, PEG-derivatives, saccharides (such as fructose, glucose) and saccharides derivatives (such as PEG-120 methyl glucose diolate), and mixtures thereof.

Examples of water phase stabilizing agents include electrolytes (e.g. alkali metal salts and alkaline earth salts, especially the chloride, borate, citrate, and sulfate salts of sodium, potassium, calcium and magnesium, as well as aluminum chlorohydrate, and polyelectrolytes, especially hyaluronic acid and sodium hyaluronate), polyols (glycerine, propylene glycol, butylene glycol, and sorbitol), alcohols such as ethyl alcohol, and hydrocolloids, and mixtures thereof.

Examples of pH controlling agents include any water soluble acid such as a carboxylic acid or a mineral acid such as hydrochloric acid, sulphuric acid, and phosphoric acid, monocarboxylic acid such as acetic acid and lactic acid, and polycarboxylic acids such as succinic acid, adipic acid, citric acid, and mixtures thereof.

Example of preservatives and cosmetic biocides include paraben derivatives (e.g. methylparaben, propylparaben), hydantoin derivatives, chlorhexidine and its derivatives, imidazolidinyl urea, diazolidinyl urea, phenoxyethanol, silver derivatives, salicylate derivatives, triclosan, ciclopirox olamine, hexamidine, oxyquinoline and its derivatives, PVP-iodine, zinc salts and derivatives such as zinc pyrithione, methylchloroisothiazolinone, methylisothiazolinone, and mixtures thereof.

Examples of sebum absorbants or sebum control agents include silica silylate, silica dimethyl silylate, dimethicone/vinyl dimethicone crosspolymer, polymethyl methacrylate, cross-linked methylmethacrylate, aluminum starch octenylsuccinate, and mixtures thereof.

Examples of pigments and colorants include surface treated or untreated iron oxides, surface treated or untreated titanium dioxide, surface treated or untreated mica, silver oxide, silicates, chromium oxides, carotenoids, carbon black, ultramarines, chlorophyllin derivatives and yellow ocher. Examples of organic pigments include aromatic types including azo, indigoid, triphenylmethane, anthraquinone, and xanthine dyes which are designated as D&C and FD&C blues, browns, greens, oranges, reds, yellows, etc, and mixtures thereof. Surface treatments include those treatments based on lecithin, silicone, silanes, fluoro compounds, and mixtures thereof.

Examples of silicone conditioning agents include silicone oils such as dimethicone; silicone gums such as dimethiconol; silicone resins such as trimethylsiloxy silicate, polypropyl silsesquioxane; silicone elastomers; alkylmethylsiloxanes; organomodified silicone oils, such as amodimethicone, aminopropyl phenyl trimethicone, phenyl trimethicone, trimethyl pentaphenyl trisiloxane, silicone quaternium-16/glycidoxy dimethicone crosspolymer, silicone quaternium-16; saccharide functional siloxanes; carbinol functional siloxanes; silicone polyethers; siloxane copolymers (divinyldimethicone/dimethicone copolymer); acrylate or acrylic functional siloxanes; and mixtures or emulsions thereof.

Examples of cationic conditioning agents include guar derivatives such as hydroxypropyltrimethylammonium derivative of guar gum; cationic cellulose derivatives, cationic starch derivatives; quaternary nitrogen derivatives of cellulose ethers; homopolymers of dimethyldiallyl ammonium chloride; copolymers of acrylamide and dimethyldiallyl ammonium chloride; homopolymers or copolymers derived from acrylic acid or methacrylic acid which contain cationic nitrogen functional groups attached to the polymer by ester or amide linkages; polymeric quaternary ammonium salts of hydroxyethyl cellulose reacted with a fatty alkyl dimethyl ammonium substituted epoxide; polycondensation products of N,N'-bis-(2,3-epoxypropyl)-piperazine or piperazine-bis-acrylamide and piperazine; and copolymers of vinylpyrrolidone and acrylic acid esters with quaternary nitrogen functionality. Specific materials include the various polyquats, e.g. Polyquaternium-7, Polyquaternium-8, Polyquaternium-10, Polyquaternium-11, and Polyquaternium-23. Other categories of conditioners include cationic surfactants such as cetyl trimethylammonium chloride, cetyl trimethylammonium bromide, stearyltrimethylammonium chloride, and mixtures thereof. In some instances, the cationic conditioning agent is also hydrophobically modified, such as hydrophobically modified quaternized hydroxyethylcellulose polymers; cationic hydrophobically modified galactomannan ether; and mixtures thereof.

Examples of hydrophobic conditioning agents include guar derivatives; galactomannan gum derivatives; cellulose derivatives; and mixtures thereof.

UV absorbers and sunscreen agents include those which absorb ultraviolet light between 290-320 nanometers (the UV-B region) and those which absorb ultraviolet light in the range of 320-400 nanometers (the UV-A region).

Some examples of sunscreen agents are aminobenzoic acid, cinoxate, diethanolamine methoxycinnamate, digalloyl trioleate, dioxybenzone, ethyl 4-[bis(Hydroxypropyl)]aminobenzoate, glyceryl aminobenzoate, homosalate, lawsone with dihydroxyacetone, menthyl anthranilate, octocrylene, ethylhexyl methoxycinnamate (or octyl methoxycinnamate), octyl salicylate (or ethylhexyl salicylate), oxybenzone, padimate O, phenylbenzimidazole sulfonic acid, red petrolatum, sulisobenzone, titanium dioxide, trolamine salicylate, and mixtures thereof.

Some examples of UV absorbers are acetaminosalol, allatoin PABA, benzalphthalide, benzophenone, benzophenone 1-12, 3-benzylidene camphor, benzylidenecamphor hydrolyzed collagen sulfonamide, benzylidene camphor sulfonic Acid, benzyl salicylate, bornelone, bumetriozole, butyl methoxydibenzoylmethane, butyl PABA, ceria/silica, ceria/silica talc, cinoxate, DEA-methoxycinnamate, dibenzoxazol naphthalene, di-t-butyl hydroxybenzylidene camphor, digalloyl trioleate, diisopropyl methyl cinnamate, dimethyl PABA ethyl cetearyldimonium tosylate, dioctyl butamido triazone, diphenyl carbomethoxy acetoxy naphthopyran, disodium bisethylphenyl tiamminotriazine stilbenedisulfonate, disodium distyrylbiphenyl triaminotriazine stilbenedisulfonate, disodium distyrylbiphenyl disulfonate, drometrizole, drometrizole trisiloxane, ethyl dihydroxypropyl PABA, ethyl diisopropylcinnamate, ethyl methoxycinnamate, ethyl PABA, ethyl urocanate, etrocrylene ferulic acid, glyceryl octanoate dimethoxycinnamate, glyceryl PABA, glycol salicylate, homosalate, isoamyl p-methoxycinnamate, isopropylbenzyl salicylate, isopropyl dibenzolylmethane, isopropyl methoxycinnamate, octyl methoxycinnamate, menthyl anthranilate, menthyl salicylate, 4-methylbenzylidene, camphor, octocrylene, octrizole, octyl dimethyl PABA, ethyl hexyl methoxycinnamate, octyl salicylate, octyl triazone, PABA, PEG-25 PABA, pentyl dimethyl PABA, phenylbenzimidazole sulfonic acid, polyacrylamidomethyl benzylidene camphor, potassium methoxycinnamate, potassium phenylbenzimidazole sulfonate, red petrolatum, sodium phenylbenzimidazole sulfonate, sodium urocanate, TEA-phenylbenzimidazole sulfonate, TEA-salicylate, terephthalylidene dicamphor sulfonic acid, titanium dioxide, triPABA panthenol, urocanic acid, VA/crotonates/methacryloxybenzophenone-1 copolymer, and mixtures thereof.

Examples of skin protectants include allantoin, aluminium acetate, aluminium hydroxide, aluminium sulfate, calamine, cocoa butter, cod liver oil, colloidal oatmeal, dimethicone, glycerin, kaolin, lanolin, mineral oil, petrolatum, shark liver oil, sodium bicarbonate, talc, witch hazel, zinc acetate, zinc carbonate, zinc oxide, and mixtures thereof.

Examples of dyes include 1-acetoxy-2-methylnaphthalene; acid dyes; 5-amino-4-chloro-o-cresol; 5-amino-2,6-dimethoxy-3-hydroxypyridine; 3-amino-2,6-dimethylphenol; 2-amino-5-ethylphenol HCl; 5-amino-4-fluoro-2-methylphenol sulfate; 2-amino-4-hydroxyethylaminoanisole; 2-amino-4-hydroxyethylaminoanisole sulfate; 2-amino-5-nitrophenol; 4-amino-2-nitrophenol; 4-amino-3-nitrophenol; 2-amino-4-nitrophenol sulfate; m-aminophenol HCl; p-aminophenol HCl; m-aminophenol; o-aminophenol; 4,6-bis(2-hydroxyethoxy)-m-phenylenediamine HCl; 2,6-bis(2-hydroxyethoxy)-3,5-pyridinediamine HCl; 2-chloro-6-ethylamino-4-nitrophenol; 2-chloro-5-nitro-N-hydroxyethyl p-phenylenediamine; 2-chloro-p-phenylenediamine; 3,4-diaminobenzoic acid; 4,5-diamino-1-((4-chlorophenyl) methyl)-1H-pyrazole-sulfate; 2,3-diaminodihydropyrazolo pyrazolone dimethosulfonate; 2,6-diaminopyridine; 2,6-diamino-3-((pyridin-3-yl)azo)pyridine; dihydroxyindole; dihydroxyindoline; N,N-dimethyl-p-phenylenediamine; 2,6-dimethyl-p-phenylenediamine; N,N-dimethyl-p-phenylenediamine sulfate; direct dyes; 4-ethoxy-m-phenylenediamine sulfate; 3-ethylamino-p-cresol sulfate; N-ethyl-3-nitro PABA; gluconamidopropyl aminopropyl dimethicone; *Haematoxylon brasiletto* wood extract; HC dyes; *Lawsonia inermis* (Henna) extract; hydroxyethyl-3,4-methylenedioxyaniline HCl; hydroxyethyl-2-nitro-p-toluidine; hydroxyethyl-p-phenylenediamine sulfate; 2-hydroxyethyl picramic acid; hydroxypyridinone; hydroxysuccinimidyl $C_{21}$-$C_{22}$ isoalkyl acidate; isatin; *Isatis tinctoria* leaf powder; 2-methoxymethyl-p-phenylenediamine sulfate; 2-methoxy-p-phenylenediamine sulfate; 6-methoxy-2,3-pyridinediamine HCl; 4-methylbenzyl 4,5-diamino pyrazole sulfate; 2,2'-methylenebis 4-aminophenol; 2,2'-methylenebis-4-aminophenol HCl; 3,4-methylenedioxyaniline; 2-methylresorcinol; methylrosanilinium chloride; 1,5-naphthalenediol; 1,7-naphthalenediol; 3-nitro-p-Cresol; 2-nitro-5-glyceryl methylaniline; 4-nitroguaiacol; 3-nitro-p-hydroxyethylaminophenol; 2-nitro-N-hydroxyethyl-p-anisidine; nitrophenol; 4-nitrophenyl aminoethylurea; 4-nitro-o-phenylenediamine dihydrochloride; 2-nitro-p-phenylenediamine dihydrochloride; 4-nitro-o-phenylenediamine HCl; 4-nitro-m-phenylenediamine; 4-nitro-o-phenylenediamine; 2-nitro-p-phenylenediamine; 4-nitro-m-phenylenediamine sulfate; 4-nitro-o-phenylenediamine sulfate; 2-nitro-p-phenylenediamine sulfate; 6-nitro-2,5-pyridinediamine; 6-nitro-o-toluidine; PEG-3 2,2'-di-p-phenylenediamine; p-phenylenediamine HCl; p-phenylenediamine sulfate; phenyl methyl pyrazolone; N-phenyl-p-phenylenediamine HCl; pigment blue 15:1; pigment violet 23; pigment yellow 13; pyrocatechol; pyrogallol; resorcinol; sodium picramate; sodium sulfanilate; solvent yellow 85; solvent yellow 172; tetraaminopyrimidine sulfate; tetrabromophenol blue; 2,5,6-triamino-4-pyrimidinol sulfate; 1,2,4-trihydroxybenzene.

Examples of fragrances include perfume ketones and perfume aldehydes. Illustrative of the perfume ketones are buccoxime; iso jasmone; methyl beta naphthyl ketone; musk indanone; tonalid/musk plus; Alpha-Damascone, Beta-Damascone, Delta-Damascone, Iso-Damascone, Damascenone, Damarose, Methyl-Dihydrojasmonate, Menthone, Carvone, Camphor, Fenchone, Alpha-lonone, Beta-lonone, Gamma-Methyl so-called lonone, Fleuramone, Dihydrojasmone, Cis-Jasmone, Iso-E-Super, Methyl-Cedrenyl-ketone or Methyl-Cedrylone, Acetophenone, Methyl-Acetophenone, Para-Methoxy-Acetophenone, Methyl-Beta-Naphtyl-Ketone, Benzyl-Acetone, Benzophenone, Para-Hydroxy-Phenyl-Butanone, Celery Ketone or Livescone, 6-Isopropyldecahydro-2-naphtone, Dimethyl-Octenone, Freskomenthe, 4-(1-Ethoxyvinyl)-3,3,5,5,-tetramethyl-Cyclohexanone, Methyl-Heptenone, 2-(2-(4-Methyl-3-cyclohexen-1-yl)propyl)-cyclopentanone, 1-(p-Menthen-6(2)-yl)-1-propanone, 4-(4-Hydroxy-3-methoxyphenyl)-2-butanone, 2-Acetyl-3,3-Dimethyl-Norbornane, 6,7-Dihydro-1,1,2,3,3-Pentamethyl-4(5H)-Indanone, 4-Damascol, Dulcinyl or Cassione, Gelsone, Hexylon, Isocyclemone E, Methyl Cyclocitrone, Methyl-Lavender-Ketone, Orivon, Para-tertiary-Butyl-Cyclohexanone, Verdone, Delphone, Muscone, Neobutenone, Plicatone, Veloutone, 2,4,4,7-Tetramethyl-oct-6-en-3-one, and Tetrameran. The fragrance may be derived or extracted from flowers, seeds, leaves, and/or roots of plants, seaweed, etc. The fragrance may be extracted from an animal, e.g. from a secretion gland, and may be a musk or sperm oil. The fragrance may also be artificially synthesized, e.g. menthol, acetate, vanilla, etc.

In specific embodiments, the perfume ketones are selected for odor character from Alpha Damascone, Delta Damascone, Iso Damascone, Carvone, Gamma-Methyl-lonone, Iso-E-Super, 2,4,4,7-Tetramethyl-oct-6-en-3-one, Benzyl Acetone, Beta Damascone, Damascenone, methyl dihydrojasmonate, methyl cedrylone, and mixtures thereof.

In specific embodiments, the perfume aldehyde is selected for odor character from adoxal; anisic aldehyde; cymal; ethyl vanillin; florhydral; helional; heliotropin; hydroxycitronellal; koavone; lauric aldehyde; lyral; methyl nonyl acetaldehyde; P. T. bucinal; phenyl acetaldehyde; undecylenic aldehyde; vanillin; 2,6,10-trimethyl-9-undecenal, 3-dodecen-1-al, alpha-n-amyl cinnamic aldehyde, 4-methoxybenzaldehyde, benzaldehyde, 3-(4-tert butylphenyl)-propanal, 2-methyl-3-(para-methoxyphenyl propanal, 2-methyl-4-(2,6,6-trimethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzyaldehyde, 1,2,3,4,5,6,7,8-octahydro-8,8-dimethyl-2-naphthaldehyde, 2,4-dimethyl-3-cyclohexen-1-carboxaldehyde, 2-methyl-3-(isopropylphenyl)propanal, 1-decanal; decyl aldehyde, 2,6-dimethyl-5-heptenal, 4-(tricyclo[5.2.1.0(2,6)]-decylidene-8)-butanal, octahydro-4,7-methano-1H-indenecarboxaldehyde, 3-ethoxy-4-hydroxy benzaldehyde, para-ethyl-alpha, alpha-dimethyl hydrocinnamaldehyde, alpha-methyl-3,4-(methylenedioxy)-hydrocinnamaldehyde, 3,4-methylenedioxybenzaldehyde, alpha-n-hexyl cinnamic aldehyde, m-cymene-7-carboxaldehyde, alpha-methyl phenyl acetaldehyde, 7-hydroxy-3,7-dimethyl octanal, Undecenal, 2,4,6-trimethyl-3-cyclohexene-1-carboxaldehyde, 4-(3)(4-methyl-3-pentenyl)-3-cyclohexen-carboxaldehyde, 1-dodecanal, 2,4-dimethyl cyclohexene-3-carboxaldehyde, 4-(4-hydroxy-4-methyl pentyl)-3-cylohexene-1-carboxaldehyde, 7-methoxy-3,7-dimethyloctan-1-al, 2-methyl undecanal, 2-methyl decanal, 1-nonanal, 1-octanal, 2,6,10-trimethyl-5,9-undecadienal, 2-methyl-3-(4-tertbutyl)propanal, dihydrocinnamic aldehyde, 1-methyl-4-(4-methyl-3-pentenyl)-3-cyclohexene-1-carbox aldehyde, 5 or 6 methoxy 10 hexahydro-4,7-methanoindan-1 or 2-carboxaldehyde, 3,7-dimethyloctan-1-al, 1-undecanal, 10-undecen-1-al, 4-hydroxy-3-methoxy benzaldehyde, 1-methyl-3-(4-methylpentyl)-3-cyclhexenecarboxaldehyde, 7-hydroxy-3,7-dimethyl-octanal, trans-4-decenal, 2,6-nonadienal, paratolylacetaldehyde; 4-methylphenylacetaldehyde, 2-methyl-4-(2,6,6-trimethyl-1-cyclohexen-1-yl)-2-butenal, ortho-methoxycinnamic aldehyde, 3,5,6-trimethyl-3-cyclohexene carboxaldehyde, 3,7-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindan-1-carboxaldehyde, 2-methyl octanal, alpha-methyl-4-(1-methyl ethyl)benzene acetaldehyde, 6,6-dimethyl-2-norpinene-2-propionaldehyde, para methyl phenoxy acetaldehyde, 2-methyl-3-phenyl-2-propen-1-al, 3,5,5-trimethyl hexanal, Hexahydro-8,8-dimethyl-2-naphthaldehyde, 3-propyl-bicyclo[2.2.1]-hept-5-ene-2-carbaldehyde, 9-decenal, 3-methyl-5-phenyl-1-pentanal, methylnonyl acetaldehyde, hexanal, trans-2-hexenal, 1-p-menthene-q-carboxaldehyde and mixtures thereof.

Examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *Camellia sinensis* oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (*Melaleuca aftemifolia*) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof.

Examples of propellant gases include carbon dioxide, nitrogen, nitrous oxide, volatile hydrocarbons such as butane, isobutane, or propane, and chlorinated or fluorinated hydrocarbons such as dichlorodifluoromethane and dichlorotetrafluoroethane or dimethylether; and mixtures thereof.

In a specific embodiment, the composition is a sunscreen. In these embodiments, personal care ingredient comprises the sunscreen agent. The sunscreen agent may be, for example, a sunscreen additive, an SPF booster, a photostabilizer, a film-forming polymer, etc. The sunscreen may be also or alternatively be utilized in sunless tanning applications. Specific examples of sunscreen agents are set forth above.

In other embodiments, the personal care ingredient comprises a hair care ingredient. In these embodiments, the composition may be referred to as a hair care composition. If utilized to prepare the composition, the hair care ingredient is typically selected from conditioning agents (which may be silicone, cationic, hydrophobic, etc.), colorants, dyes, ultraviolet (UV) absorbers, preservatives, plant extracts, fatty alcohols, vitamins, fragrance, anti-dandruff agents, color care additives, pearlising agents, pH controlling agents, electrolytes, chelating agents, styling agents, ceramides, amino-acid derivatives, suspending agents, surfactants, detergents, emulsifiers, thickeners, oxidizing agents, reducing agents, film-forming polymers, and combinations thereof. With some of these hair care embodiments, the composition may be referred to as a shampoo, a rinse-off conditioner, a leave-in conditioner, a gel, a pomade, a serum, a spray, a coloring product, or mascara. Examples of many of these hair care ingredients are set forth above as suitable personal care ingredients.

Examples of oxidizing agents are ammonium persulfate, calcium peroxide, hydrogen peroxide, magnesium peroxide, melamine peroxide, potassium bromate, potassium caroate, potassium chlorate, potassium persulfate, sodium bromate, sodium carbonate peroxide, sodium chlorate, sodium iodate, sodium perborate, sodium persulfate, strontium dioxide, strontium peroxide, urea peroxide, zinc peroxide, and mixtures thereof.

Examples of reducing agents are ammonium bisufite, ammonium sulfite, ammonium thioglycolate, ammonium thiolactate, cystemaine HCl, cystein, cysteine HCl, ethanolamine thioglycolate, glutathione, glyceryl thioglycolate, glyceryl thioproprionate, hydroquinone, p-hydroxyanisole, isooctyl thioglycolate, magnesium thioglycolate, mercaptopropionic acid, potassium metabisulfite, potassium sulfite, potassium thioglycolate, sodium bisulfite, sodium hydrosulfite, sodium hydroxymethane sulfonate, sodium metabisulfite, sodium sulfite, sodium thioglycolate, strontium thioglycolate, superoxide dismutase, thioglycerin, thioglycolic acid, thiolactic acid, thiosalicylic acid, zinc formaldehyde sulfoxylate, and mixtures thereof.

Examples of antidandruff agents include pyridinethione salts, selenium compounds such as selenium disulfide, and soluble antidandruff agents, and mixtures thereof.

In other embodiments, the personal care ingredient comprises a nail care ingredient. In these embodiments, the composition may be referred to as a nail care composition. If utilized to prepare the composition, the nail care ingredient may be any ingredient utilized in nail care compositions, e.g. nail polishes, nail gels, nail tips, acrylic finishes, etc. Examples of such nail care ingredients include pigments, resins, solvents, volatile halogenated compounds (e.g. methoxynonafluorobutane and/or ethoxynonafluorobutane), etc.

More specifically, examples of nail care ingredients include butyl acetate; ethyl acetate; nitrocellulose; acetyl tributyl citrate; isopropyl alcohol; adipic acid/neopentyl glycol/trimelitic anhydride copolymer; stearalkonium bentonite; acrylates copolymer; calcium pantothenate; *Cetraria islandica* extract; *Chondrus crispus*; styrene/acrylates copolymer; trimethylpentanediyl dibenzoate-1; polyvinyl butyral; N-butyl alcohol; propylene glycol; butylene glycol; mica; silica; tin oxide; calcium borosilicate; synthetic fluorphlogopite; polyethylene terephtalate; sorbitan laurate derivatives; talc; jojoba extract; diamond powder; isobutylphenoxy epoxy resin; silk powder; and mixtures thereof.

In other embodiments, the personal care ingredient comprises a tooth care ingredient. In these embodiments, the composition may be referred to as a tooth care composition. One specific example of such a tooth care composition is toothpaste. Another example of a tooth care composition is a tooth whitening composition. The tooth care ingredient may be any tooth care ingredient suitable for the tooth care composition, such as an abrasive compound (e.g. aluminum hydroxide, calcium carbonate, silica, zeolite), a fluoride compound, a surfactant, a flavorant, a remineralizer, an antibacterial agent, etc.

In certain embodiments, the personal care ingredient comprises a film-forming polymer, which may be utilized as the personal care ingredient whether the composition is utilized for skin care, hair care, etc. "Film-forming polymer," as used herein, means a polymer or oligomer which is capable of, by itself or optionally in the presence of a film-forming agent, forming a film on a substrate. The film-forming polymer may form the film upon an application of a curing condition, e.g. the application of heat, exposure to atmospheric conditions, etc. Alternatively, the film-forming polymer may form the film upon evaporation of any carrier vehicle in which the film-forming polymer may optionally be disposed. The film-forming polymer may undergo a reaction, e.g. the film-forming polymer may become cross-linked or otherwise include additional bonds, when forming the film. However, the film-forming polymer may form the film in the absence of such a reaction. The film-forming polymer may be a gelling agent. The film-forming polymer is particularly advantageous when the composition is the sunscreen, although the personal care ingredient may comprise the film-forming polymer in other compositions as well.

The substrate on which the film is formed may be any substrate, although the substrate is generally a portion of a mammal, particularly a human, as described in greater detail below with reference to the treatment method. Specific examples of suitable substrates include skin, hair, and nails.

Generally, the film is continuous, although the film may have a varying thickness. By continuous, it is meant that the film does not define any apertures. The film may be referred to as being macroscopically continuous. The film may be supported by the substrate, or may be bonded, e.g. physically and/or chemically, to the substrate. In certain embodiments, the film is optionally removable from the substrate, e.g. the film may be peelable from the substrate. The film may remain intact as a free-standing film upon being separated from the substrate or may be separated through application of shear, which may damage and/or destroy continuity of the film.

Specific examples of film-forming polymers that are suitable include acrylic polymers, silicone resins (e.g. polypropylsilsesquioxane), polyurethanes, polyurethane-acrylics, polyesters, polyester-polyurethanes, polyether-polyurethanes, polyesteramides, alkyds, polyamides, polyureas, polyurea-polyurethanes, cellulose-based polymers (e.g. nitrocellulose), silicones, acrylic-silicones, polyacrylamides, fluoropolymers, polyisoprenes, and any copolymers or terpolymers thereof or including one of these. The term "silicones," as used herein with reference to suitable film-forming polymers, includes linear, branched, and resinous silicones, although resinous silicones are generally referred to as silicone resins rather than polymers. The silicone may be modified, e.g. the silicone may be a silicone-grafted acrylic polymer.

As introduced above, the film-forming polymer may be disposed in a carrier vehicle, which may partially or fully solubilize the film-forming polymer. Depending on a selection of the film-forming polymer, the carrier vehicle may be, for example, an oil, e.g. an organic oil and/or a silicone oil, a solvent, water, etc. The film-forming polymer may be in the form of polymer particles, which are optionally surface-stabilized with at least one stabilizer, and the polymer particles may be present as a dispersion or emulsion.

The film-forming polymer may be a block polymer, which may be styrene-free. Typically, the block polymer comprises at least one first block and at least one second block, which may be linked together via an intermediate block comprising at least one constituent monomer of the first block and at least one constituent monomer of the second block. Generally, the glass transition temperatures of the first and second blocks are different from one another.

Monomers that may be utilized to prepare the block polymer include, for example, methyl methacrylate, isobutyl (meth)acrylate and isobornyl (meth)acrylate, methyl acrylate, isobutyl acrylate, n-butyl methacrylate, cyclodecyl acrylate, neopentyl acrylate, isodecylacrylamide 2-ethylhexyl acrylate and mixtures thereof.

In specific embodiments, the film-forming polymer be obtained or generated via free-radical polymerization. For example, the film-forming polymer may be generated via free-radical polymerization of at least one acrylic monomer and at least one silicone- or hydrocarbon-based macromonomer including a polymerizable end group.

Specific examples of hydrocarbon-based macromonomers include homopolymers and copolymers of linear or branched $C_8$-$C_{22}$ alkyl acrylate or methacrylate. The polymerizable end group may be a vinyl group or a (meth)acrylate group, e.g. poly(2-ethylhexyl acrylate) macromonomers; poly(dodecyl acrylate) or poly(dodecyl methacrylate) macromonomers; poly(stearyl acrylate) or poly(stearyl methacrylate) macromonomers, etc. Such macromonomers generally include one (meth)acrylate group as the polymerizable end group.

Additional examples of hydrocarbon-based macromonomers include polyolefins containing an ethylenically unsaturated end group (as the polymerizable end group), e.g. a (meth)acrylate end group. Specific examples of such polyolefins include polyethylene macromonomers, polypropylene macromonomers, polyethylene/polypropylene copolymer macromonomers, polyethylene/polybutylene copolymer macromonomers, polyisobutylene macromonomers; polybutadiene macromonomers; polyisoprene macromonomers; polybutadiene macromonomers; and poly (ethylene/butylene)-polyisoprene macromonomers.

Examples of silicone-based macromonomers include organopolysiloxanes containing the polymerizable end group, e.g. a (meth)acrylate end group. The organopolysiloxane may be linear, branched, partially branched, or resinous. In various embodiments, the organopolysiloxane is linear. In these embodiments, the organopolysiloxane may be polydimethylsiloxane, although hydrocarbon groups other than methyl groups may be present therein along with or in lieu of methyl groups. Typically, the polymerizable end group is terminal, although the polymerizable end group may optionally be pendant. One specific example of a silicone-based macromonomer is a monomethacryloxypropyl polydimethylsiloxane.

In certain embodiments, the film-forming polymer is an organic film-forming polymer that is soluble in oil as the carrier vehicle. In these embodiments, the film-forming polymer may be referred to as a liposoluble polymer. The liposoluble polymer may be of any type and specific examples thereof include those comprising or formed from olefins, cycloolefins, butadiene, isoprene, styrene, vinyl ethers, vinyl esters, vinyl amides, (meth)acrylic acid esters or amides, etc.

In one embodiment, the liposoluble polymer is formed from monomers selected from the group consisting of isooctyl (meth)acrylate, isononyl (meth)acrylate, 2-ethylhexyl (meth)acrylate, lauryl (meth)acrylate, isopentyl (meth)acrylate, n-butyl (meth)acrylate, isobutyl (meth)acrylate, methyl (meth)acrylate, tert-butyl (meth)acrylate, tridecyl (meth) acrylate, stearyl (meth)acrylate, and combinations thereof.

Alternatively still, the liposoluble polymer may be an acrylic-silicone grafted polymer, which typically includes a silicone backbone and acrylic grafts or alternatively includes an acrylic backbone and silicone grafts.

The film-forming polymer may be halogenated, e.g. the film-forming polymer may include fluorine atoms.

Alternatively as introduced above, the film-forming polymer may be a cellulose-based polymer, such as nitrocellulose, cellulose acetate, cellulose acetobutyrate, cellulose acetopropionate or ethylcellulose. Alternatively still, the film-forming polymer may comprise a polyurethane, an acrylic polymer, a vinyl polymer, a polyvinyl butyral, an alkyd resin, or resins derived from aldehyde condensation products, such as arylsulfonamide-formaldehyde resins.

Further, as introduced above, the film-forming polymer may comprise the silicone, which may be linear, branched, or resinous. Resinous silicones generally include at least one T and/or Q unit, as understood in the art. Examples of resinous silicones include silsesquioxanes. The silicone may include any combination of M, D, T, and Q units so long as the silicone constitutes the film-forming polymer.

When the film-forming polymer comprises the silicone, the film-forming polymer may comprise an amphiphilic silicone. Amphiphilic silicones typically contain a silicone portion which is compatible with a silicone medium, and a hydrophilic portion. The hydrophilic portion may be, for example, the residue of a compound selected from alcohols and polyols, having 1 to 12 hydroxyl groups, and polyoxyalkylenes (e.g. those containing oxypropylene units and/or oxyethylene units).

The amphiphilic silicone may be an oil with or without gelling activity. Oils of this kind may comprise, for example, dimethicone copolyols, bis-hydroxyethoxypropyl dimethicone, etc.

In one embodiment, the film-forming polymer comprises a silicone organic elastomer gel. Silicone organic elastomer gels comprise linear organopolysiloxane chains crosslinked via polyoxyalkylenes. The silicone organic elastomer gel may further include hydrophilic polyether functionality pending from the linear organopolysiloxane chains. Specific examples of suitable silicone organic elastomer gels are disclosed in International (PCT) Appln. No. PCT/US2010/020110.

In various embodiments, the personal care ingredient may comprise or be referred to as a personal care active, a health care active, or combination thereof (collectively "active" or "actives"). As used herein, a "personal care active" means any compound or mixtures of compounds that are known in the art as additives in personal care formulations, typically for providing a cosmetic and/or aesthetic benefit. A "healthcare active" means any compound or mixtures of compounds that are known in the art to provide a pharmaceutical or medical benefit. Thus, "healthcare active" includes materials considered as an active ingredient or active drug ingredient as generally used and defined by the United States Department of Health & Human Services Food and Drug Administration, contained in Title 21, Chapter I, of the Code of Federal Regulations, Parts 200-299 and Parts 300-499. Specific personal care actives and health care actives are described below. These personal care actives and health care actives may constitute the personal care ingredient whether the personal care ingredient is utilized to form, for example, the AP/DEO composition, the skin care composition, the hair care composition, the nail care composition, and/or the tooth care composition. For example, in various embodiments, the same personal care ingredient may be utilized to form either the hair care composition or the skin care composition. As understood in the art, at least some of the personal care actives described below are species of certain personal care ingredients introduced above with respect to the skin care composition, the hair care composition, the nail care composition, and the tooth care composition, respectively. For example, numerous species of plant or vegetable extracts are described below, which are exemplary examples of plant extracts set forth above as suitable personal care ingredients. The active ingredients or actives described below may constitute the personal care ingredient of the composition or may be utilized in combination therewith.

Useful active ingredients for use in the composition include vitamins and vitamin derivatives, including "provitamins". Vitamins useful herein include, but are not limited to, Vitamin A1, retinol, $C_2$-$C_{18}$ esters of retinol, vitamin E, tocopherol, esters of vitamin E, and mixtures thereof. Retinol includes trans-retinol, 1,3-cis-retinol, 11-cis-retinol, 9-cis-retinol, and 3,4-didehydro-retinol, Vitamin C and its derivatives, Vitamin B1, Vitamin B2, Pro Vitamin B5, panthenol, Vitamin B6, Vitamin B12, niacin, folic acid, biotin, and pantothenic acid. Other suitable vitamins and the INCI names for the vitamins considered included herein are ascorbyl dipalmitate, ascorbyl methylsilanol pectinate, ascorbyl palmitate, ascorbyl stearate, ascorbyl glucocide, sodium ascorbyl phosphate, sodium ascorbate, disodium ascorbyl sulfate, potassium (ascorbyl/tocopheryl) phosphate. In general, retinol, all trans retinoic acid and derivatives, isomers and analogs thereof, are collectively termed "retinoids".

RETINOL, it should be noted, is an International Nomenclature Cosmetic Ingredient Name (INCI) designated by The Cosmetic, Toiletry, and Fragrance Association (CTFA), Washington D.C., for vitamin A. Other suitable vitamins and the INCI names for the vitamins considered included herein are RETINYL ACETATE, RETINYL PALMITATE, RETINYL PROPIONATE, α-TOCOPHEROL, TOCOPHERSOLAN, TOCOPHERYL ACETATE, TOCOPHERYL LINOLEATE, TOCOPHERYL NICOTINATE, and TOCOPHERYL SUCCINATE.

Some examples of commercially available products suitable for use herein are Vitamin A Acetate and Vitamin C, both products of Fluka Chemie AG, Buchs, Switzerland; COVI-OX T-50, a vitamin E product of Henkel Corporation, La Grange, Illinois; COVI-OX T-70, another vitamin E product of Henkel Corporation, La Grange, Illinois; and vitamin E Acetate, a product of Roche Vitamins & Fine Chemicals, Nutley, N.J.

The active can be a protein, such as an enzyme. Enzymes include, but are not limited to, commercially available types, improved types, recombinant types, wild types, variants not found in nature, and mixtures thereof. For example, suitable enzymes include hydrolases, cutinases, oxidases, transferases, reductases, hemicellulases, esterases, isomerases, pectinases, lactases, peroxidases, laccases, catalases, and mixtures thereof. Hydrolases include, but are not limited to, proteases (bacterial, fungal, acid, neutral or alkaline), amylases (alpha or beta), lipases, mannanases, cellulases, collagenases, lisozymes, superoxide dismutase, catalase, and mixtures thereof. Protease include, but are not limited to, trypsin, chymotrypsin, pepsin, pancreatin and other mammalian enzymes; papain, bromelain and other botanical enzymes; subtilisin, epidermin, nisin, naringinase (L-rhammnosidase) urokinase and other bacterial enzymes. Lipase include, but are not limited to, triacyl-glycerol lipases, monoacyl-glycerol lipases, lipoprotein lipases, e.g. steapsin, erepsin, pepsin, other mammalian, botanical, bacterial lipases and purified ones. In a specific embodiment, natural papain is utilized as the enzyme. Further, stimulating hormones, e.g. insulin, can be used together with the enzyme (s) to boost effectiveness.

The active may also be one or more plant or vegetable extract. Examples of these components are as follows: Ashitaba extract, avocado extract, hydrangea extract, Althea extract, Arnica extract, aloe extract, apricot extract, apricot kernel extract, *Ginkgo biloba* extract, fennel extract, turmeric [Curcuma] extract, oolong tea extract, rose fruit extract, Echinacea extract, Scutellaria root extract, Phellodendro bark extract, Japanese Coptis extract, Barley extract, Hyperium extract, White Nettle extract, Watercress extract, Orange extract, Dehydrated saltwater, seaweed extract, hydrolyzed elastin, hydrolyzed wheat powder, hydrolyzed silk, Chamomile extract, Carrot extract, Artemisia extract, Glycyrrhiza extract, hibiscustea extract, Pyracantha Fortuneana Fruit extract, Kiwi extract, Cinchona extract, cucumber extract, guanocine, Gardenia extract, Sasa Albo-marginata extract, Sophora root extract, Walnut extract, Grapefruit extract, Clematis extract, Chlorella extract, mulberry extract, Gentiana extract, black tea extract, yeast extract, burdock extract, rice bran ferment extract, rice germ oil, comfrey extract, collagen, cowberry extract, Gardenia extract, Asiasarum Root extract, Family of Bupleurum extract, Salvia extract, Saponaria extract, Bamboo extract, Crataegus fruit extract, Zanthoxylum fruit extract, shiitake extract, Rehmannia root extract, gromwell extract, Perilla extract, linden extract, Filipendula extract, peony extract, Calamus Root extract, white birch extract, Horsetail extract, *Hedera helix* (Ivy) extract, hawthorn extract, *Sambucus nigra* extract, *Achillea millefolium* extract, *Mentha piperita* extract, sage extract, mallow extract, *Cnidium officinale* Root extract, Japanese green gentian extract, soybean extract, jujube extract, thyme extract, tea extract, clove extract, *Gramineae imperata* cyrillo extract, *Citrus unshiu* peel extract Japanese Angellica Root extract, Calendula extract, Peach Kernel extract, Bitter orange peel extract, *Houttuyna cordata* extract, tomato extract, natto extract, *Ginseng* extract, Green tea extract (*Camelliea sinesis*), garlic extract, wild rose extract, hibiscus extract, *Ophiopogon tuber* extract, *Nelumbo nucifera* extract, parsley extract, honey, hamamelis extract, Parietaria extract, *Isodonis herba* extract, bisabolol extract, Loquat extract, coltsfoot extract, butterbur extract, *Porid cocos* wolf extract, extract of butcher's broom, grape extract, propolis extract, luffa extract, safflower extract, peppermint extract, linden tree extract, Paeonia extract, hop extract, pine tree extract, horse chestnut extract, Mizu-bashou [*Lysichiton camtschatcese*] extract, Mukurossi peel extract, Melissa extract, peach extract, cornflower extract, eucalyptus extract, saxifrage extract, citron extract, coix extract, mugwort extract, lavender extract, apple extract, lettuce extract, lemon extract, Chinese milk vetch extract, rose extract, rosemary extract, Roman Chamomile extract, royal jelly extract, and combinations thereof.

Representative, non-limiting examples of healthcare actives useful as drugs in the present compositions are described below. One or more of the drugs can be used, either alone or in combination with the actives and/or personal care ingredients described above.

The composition may include an antiparasite agent. The antiparasite agent can be of any type. Examples of antiparasite agents include, but are not limited to, hexachlorobenzene, carbamate, naturally occurring pyrethroids, permethrin, allethrin, malathion, piperonyl butoxide, and combinations thereof.

The composition may include an antimicrobial agent, also referred to as germicidal agent. The antimicrobial agent can be of any type. Examples of antimicrobial agents include, but are not limited to, phenols, including cresols and resorcinols. Such compositions may be used to treat infections of the skin. An example of a very common skin infection is acne, which involve infestation of the sebaceous gland with *P. acnes*, as well as *Staphylococus aurus* or *Pseudomonas*. Examples of useful antiacne actives include the keratolytics such as salicylic acid (o-hydroxybenzoic acid), derivatives of salicylic acid such as 5-octanoyl salicylic acid, and resorcinol; retinoids such as retinoic acid and its derivatives (e.g. cis and trans); sulfur-containing D and L amino acids and their derivatives and salts, particularly their N-acetyl derivatives, e.g. N-acetyl-L-cysteine; lipoic acid; antibiotics and antimicrobials such as benzoyl peroxide, octopirox, tetracycline, 2,4,4'-trichloro-2'-hydroxy diphenyl ether, 3,4,4'-trichlorobanilide, azelaic acid and its derivatives, phenoxyethanol, phenoxypropanol, phenoxyisopropanol, ethyl acetate, clindamycin and meclocycline; sebostats such as flavonoids; and bile salts such as scymnol sulfate and its derivatives, deoxycholate and cholate; parachlorometaxylenol; and combinations thereof.

Phenols, in concentrations of 0.2, 1.0, and 1.3, % by weight, are generally bacteriostatic, bactericidal, and fungicidal, respectively. Several phenol derivatives are more potent than phenol itself, and the most important among these are the halogenated phenols and bis-phenols, the alkyl-substituted phenols and the resorcinols. Hydrophobic antibacterials include triclosan, triclocarbon, eucalyptol, menthol, methylsalicylate, thymol, and combinations thereof.

The composition may include an antifungal agent. The antifungal agent can be of any type. Examples of antifungal agents include, but are not limited to, azoles, diazoles, triazoles, miconazole, fluconazole, ketoconazole, clotrimazole, itraconazole griseofulvin, ciclopirox, amorolfine, terbinafine, Amphotericin B, potassium iodide, flucytosine (5FC) and combinations thereof. U.S. Pat. No. 4,352,808 discloses 3-aralkyloxy-2,3-dihydro-2-(1H-imidazolylmethyl)benzo[b]thiophene compounds having antifungal and antibacterial activity, which are incorporated herein by reference.

The composition may include a steroidal anti-inflammatory agent. The steroidal anti-inflammatory agent can be of any type. Examples of steroidal anti-inflammatory agents include, but are not limited to, corticosteroids such as hydrocortisone, hydroxyltriamcinolone alphamethyl dexamethasone, dexamethasone-phosphate, beclomethasone dipropionate, clobetasol valerate, desonide, desoxymethasone, desoxycorticosterone acetate, dexamethasone, dichlorisone, diflorasone diacetate, diflucortolone valerate, fluadrenolone, fluclarolone acetonide, fludrocortisone, flumethasone pivalate, fluosinolone acetonide, fluocinonide, flucortine butylester, fluocortolone, fluprednidene (fluprednylidene)acetate, flurandrenolone, halcinonide, hydrocortisone acetate, hydrocortisone butyrate, methylprednisolone, triamcinolone acetonide, cortisone, cortodoxone, flucetonide, fludrocortisone, difluorosone diacetate, fluradrenalone acetonide, medrysone, amc, amcinafide, betamethasone and the balance of its esters, chlorprednisone, chlorprednisone acetate, clocortelone, clescinolone, dichlorisone, difluprednate, flucloronide, flunisolide, fluorometholone, fluperolone, fluprednisolone, hydrocortisone valerate, hydrocortisone cyclopentylproprionate, hydrocortamate, meprednisone, paramethasone, prednisolone, prednisone, beclomethasone dipropionate, betamethasone dipropionate, triamcinolone, and combinations thereof.

Topical antihistaminic preparations currently available include 1 percent and 2 percent diphenhydramine (Benadryl® and Caladryl®), 5 percent doxepin (Zonalon®) cream, phrilamine maleate, chlorpheniramine and tripelennamine, phenothiazines, promethazine hydrochloride (Phenergan®) and dimethindene maleate. These drugs, as well as additional antihistamines can also be included in the composition. Additionally, so-called "natural" anti-inflammatory agents may be useful. For example, candelilla wax, alpha bisabolol, aloe vera, Manjistha (extracted from plants in the genus *Rubia*, particularly *Rubia cordifolia*), and Guggal (extracted from plants in the genus *Commiphora*, particularly *Commiphora mukul*, may be used as an active in the composition.

The composition may include a non-steroidal anti-inflammatory drug (NSAID). The NSAID can be of any type. Examples of NSAIDs include, but are not limited to, the following NSAID categories: propionic to acid derivatives; acetic acid derivatives; fenamic acid derivatives; biphenylcarboxylic acid derivatives; and oxicams. Such NSAIDs are described in the U.S. Pat. No. 4,985,459, which is incorporated herein by reference. Further examples include, but are not limited to, acetyl salicylic acid, ibuprofen, naproxen, benoxaprofen, flurbiprofen, fenoprofen, fenbufen, ketoprofen, indoprofen, pirprofen, carprofen, oxaprozin, pranoprofen, mniroprofen, tioxaprofen, suprofen, alminoprofen, tiaprofenic acid, fluprofen, bucloxic acid, and combinations thereof.

The composition may include an antioxidant/radical scavenger. The antioxidant can be of any type. Examples of antioxidants include, but are not limited to, ascorbic acid (vitamin C) and its salts, tocopherol (vitamin E), and its derivatives such as tocopherol sorbate, other esters of tocopherol, butylated hydroxy benzoic acids and their salts, 6-hydroxy-2,5,7,8-tetramethylchroman-2-carboxylic acid (commercially available under the trade name Trolox®), gallic acid and its alkyl esters, especially propyl gallate, uric acid and its salts and alkyl esters, sorbic acid and its salts, the ascorbyl esters of fatty acids, amines (e.g. N,N-diethylhydroxylamine, amino-guanidine), sulfhydryl compounds (e.g. glutathione), and dihydroxy fumaric acid and its salts may be used, as well as EDTA, BHT and the like, and combinations thereof.

The composition may include an antibiotic. The antibiotic can be of any type. Examples of antibiotics include, but are not limited to, chloramphenicol, tetracyclines, synthetic and semi-synthesic penicillins, beta-lactames, quinolones, fluoroquinolnes, macrolide antibiotics, peptide antibiotics, cyclosporines, erythromycin, clindamycin, and combinations thereof.

The composition may include a topical anesthetic. The topical anesthetic can be of any type. Examples of topical anesthetics include, but are not limited to, benzocaine, lidocaine, bupivacaine, chlorprocaine, dibucaine, etidocaine, mepivacaine, tetracaine, dyclonine, hexylcaine, procaine, cocaine, ketamine, pramoxine, phenol, pharmaceutically acceptable salts thereof, and combinations thereof.

The composition may include an anti-viral agent. The anti-viral agent can be of any type. Examples of anti-viral agents include, but are not limited to, proteins, polypeptides, peptides, fusion protein antibodies, nucleic acid molecules, organic molecules, inorganic molecules, and small molecules that inhibit or reduce the attachment of a virus to its receptor, the internalization of a virus into a cell, the replication of a virus, or release of virus from a cell. In particular, anti-viral agents include, but are not limited to, nucleoside analogs (e.g. zidovudine, acyclovir, acyclovir prodrugs, famciclovir, gangcyclovir, vidarabine, idoxuridine, trifluridine, and ribavirin), n-docosanoll foscarnet, amantadine, rimantadine, saquinavir, indinavir, ritonavir, idoxuridine alpha-interferons and other interferons, AZT, and combinations thereof.

Additional examples of actives include analgesic agents and antihypertensive agents. Analgesic agents are known in the art and are colloquially referred to as painkillers. The analgesic agent may be selected from any known analgesic agents, and specific examples thereof include paracetamol (acetaminophen), morphine, codeine, heroine, methadone, thebaine, orpiarine, buprenorphine, morphinans, benzomorphans, acetaminophen, butorphanol, diflunisal, fenoprofen, fentanyl, fentanyl citrate, hydrocodone, aspirin, sodium salicylate, ibuprofen, oxymorphone, pentaxicine, naproxen, nalbuphine, mefenamic acid, meperidine and dihydroergotamine, non-steroidal anti-inflammatory agents, such as salicylates, and opioid agents, such as morphine and oxycodone. Antihypertensive agents are known in the art for treating or reducing hypertension, i.e., high blood pressure. The antihypertensive agent may be selected from any known antihypertensive agents, and specific examples thereof include diuretics, adrenergic receptor antagonists (e.g. beta blockers), benzodiazepines, calcium channel blockers, renin inhibitors, etc.

A typical narcotic antagonist is haloxone. Exemplary antitussive agents include, without limitation, diphenhydramine, guaifenesin, hydromorphone, ephedrine, phenylpropanolamine, theophylline, codeine, noscapine, levopropoxyphene, carbetapentane, chlorpehndianol and benzonatate.

Among the sedatives which may be utilized are, without limitation, chloral hydrate, butabarbital, alprazolam, amobarbital, chlordiazepoxide, diazepam, mephobarbital, secobarbital, diphenhydramine, ethinamate, flurazepam, halazepam, haloperidol, prochlorperazine, oxazepam, and talbutal.

Examples of cardiac drugs are, without limitation, quinidine, propranolol, nifedipine, procaine, dobutamine, digitoxin, phenyloin, sodium nitroprusside, nitroglycerin, verapamil HCl, digoxin, nicardipine HCl, and isosorbide dinitrate.

Antiemetics are illustrated by, without limitation, thiethylperazine, metoclopramide, cyclizine, meclizine, prochlorperazine, doxylamine succinate, promethazine, triflupromazine, and hydroxyzine.

A typical dopamine receptor agonist is bromocriptine mesylate. Exemplary amino acid, peptide and protein hormones include, without limitation, thyroxine, growth hormone (GH), interstitial cell stimulating hormone (ICSH), follicle-stimulating hormone (FSH), thyrotropic hormone (TSH), adrenocorticotropic hormone (ACTH), gonadotropin releasing hormone (GnRH) such as leuprolide acetate, vasopressin and their active degradation products Some products may have sufficiently high molecular weights that absorption through the stratum corneum or mucous membranes may be difficult. Therefore, the invention is applicable only to those hormones which have molecular weights and stereo configurations which will allow passage through the skin.

Female sex hormones that can be used include, without limitations, estradiol, diethylstilbestrol, conjugated estrogens, estrone, norethindrone, medroxyprogesterone, progesterone, and norgestrel. Typical male sex hormones that may be utilized may be represented by, without limitation, testosterone, methyltestosterone, and fluoxymesterone.

As introduced above, the emulsion may include various additives (e.g. those added during preparation of the emulsion), such that the emulsion itself functions as an end-use composition. However, the emulsion may also be combined with various additional components (e.g. after its preparation), such as those described above, and thus formulated into various end-use compositions, such as a personal care compositions. Such compositions may be of any form, such as a cream, gel, powder, paste, or freely pourable liquid. Compositions comprising or formed from the emulsion of the present disclosure may exhibit improved application and cosmetic properties (including reduced tackiness and stickiness), and improved clarity/low residue properties.

In some embodiments, the emulsion is itself a personal care composition, or may be formulated into a personal care composition. In such embodiments, the personal care composition may be formulated to be cosmetic, therapeutic, functional with respect to a portion of a body to which the personal care composition is applied, or some combinations thereof. Examples of personal care compositions include antiperspirants and deodorants, skin care creams, skin care lotions, moisturizers, facial treatments (e.g. acne or wrinkle removers), personal and facial cleansers, bath oils, perfumes, colognes, sachets, sunscreens, pre-shave and after-shave lotions, shaving soaps and lathers, shampoos, conditioners, hair colorants, hair relaxants, hair sprays, mousses, hair gels, permanents, depilatories, cuticle coats, make-ups, color cosmetics, foundations, concealers, blushes, lipsticks, eyeliners, mascara, oil removers, color cosmetic removers, and medicament creams, pastes or sprays (e.g. for anti-*acnes*, dental hygienics, antibiotics, healing promotives, etc.). In general, the personal care composition comprising the emulsion is formulated with a carrier that permits application in a conventional form, such as a liquid, rinse, lotion, cream, paste, gel, foam, mousse, ointment, spray, aerosol, soap, stick, soft solid, or solid gel, e.g. depending on the intended use. What constitutes a suitable carrier for formulating the personal care composition is readily apparent to one of ordinary skill in the art, and may be selected from those carriers exemplified herein.

The personal care composition may be in any form, either liquid or non-liquid (semi-solid, soft solid, solid, etc.). For example, the personal care composition may be a paste, a solid, a gel, or a cream. Additionally, regardless of how the emulsion was prepared, the personal care composition formed from the emulsion may itself be an emulsion, such as an oil-in-water or water-in-oil emulsion, a multiple emulsion, such as an oil-in-water-in-oil emulsion or a water-in-oil-in-water emulsion, or a solid, rigid or supple gel, including anhydrous gels. The personal care composition can also be in a form chosen from a translucent anhydrous gel and a transparent anhydrous gel. The personal care composition may, for example, comprise an external or continuous fatty phase. The personal care composition may be anhydrous. In some instances, the personal care composition can be a molded composition or cast as a stick or a dish. In specific embodiments, the personal care composition comprising the emulsion is a molded poured stick. In such embodiments, the personal care composition (e.g. in stick form) may behave as deformable, flexible elastic solid, having increased elastic softness on application.

The personal care composition comprising the emulsion can be used by any method, such as via application to a human body (e.g. skin or hair) by hand or with an applicator (e.g. a brush or sprayer). In some embodiments, the personal care composition may be intended to be removed after such application, e.g. by washing, wiping, peeling, and the like, or combinations thereof.

The following examples, illustrating embodiments of this disclosure, are intended to illustrate and not to limit the invention. The brief summary immediately below provides information as to certain abbreviations, shorthand notations, and components utilized in the Examples. Each group not expressly shown and pending from a silicon atom is a methyl group ($—CH_3$) unless otherwise indicated.

"Si10PrCl" is a branched organosilicon having 10 silicon atoms and a chloropropyl group (PrCl; $—CH_2CH_2CH_2—Cl$), and is of the general formula (a) below.

(a)

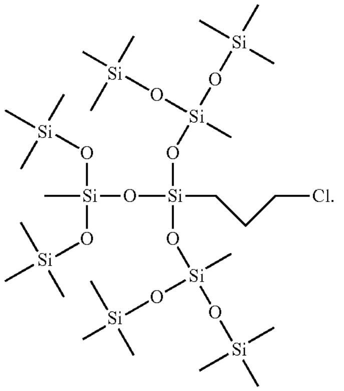

"Si7PrCl" is a branched organosilicon having 7 silicon atoms and a chloropropyl group (PrCl; $—CH_2CH_2CH_2—Cl$), and is of the general formula (b) below.

(b)

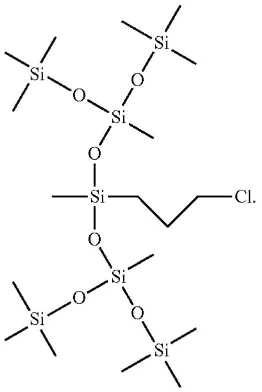

Example 1: Synthesis of Si10NMEA 69.3 g of chloropropyl Si dendrimer (Si10PrCl) and 36.2 g of 2-(N-methyl)aminoethanol (NMEA) were charged into a 250 ml 4-neck flask equipped with mechanical stirrer, thermal couple, and water-cooled condenser adapted to $N_2$ bubbler. The unfilled space in the system was purged with $N_2$ for 2-3 minutes, and the pot temperature was raised to and held at 150-160° C. for 20 hours. GC-FID analysis was utilized to monitor the conversion of Si10PrCl to to Si10NMEA (99% after 14 hours). The reaction was then cooled down to RT, and the reaction mixture transferred to a separation funnel. The bottom layer (yellow color) was discarded, and the top layer transferred to a receiving flask and concentrated in vacuo (rotovap; 120° C. and <1 mmHg) for at least 1 hour to give the product (Si10NMEA; slightly hazy and almost colorless).

Preparation Examples 1-5: Synthesis of Si10NMEA

The procedure of Example 1 was repeated five separate times with slight modifications to give Preparation Examples 1-5, as described below. In each of Preparation Examples 1-5, a base (1.2-2.0 eq.) was added to the reaction mixture prior to heating, and the reaction heated to and held at 160° C. for 6 hours. In each Preparation Example, the solids were filtered out before the reaction mixture was transferred to the separation funnel as described in Example 1 above. In each of Preparation Examples 1-5, the conversion of Si10PrCl to Si10NMEA was >99% after the 6 hours.

In Preparation Example 1 the base is $Na_2CO_3$.

In Preparation Example 2 the base is $CaCO_3$.

In Preparation Example 3 the base is ZnO.

In Preparation Example 4 the base is MgO.

In Preparation Example 5 the base is $MgCO_3—Mg(OH)_2$.

Example 2: Synthesis of Si10NMEA with Water Washing to Remove Amine Salts

Chloropropylsilicone dendrimer was loaded to a 2 L agitated reactor set to 160° C. NMEA was loaded after the reactor reached 160° C., to give an overall amine:ClPr molar ratio of 4. The reactor was held at 159° C. for a total reaction time (from beginning) of 24 hours. After cooling and phase separating for 1.5 hours, 179 g of salt layer material was removed by bottom phase separation. 176 g of water and 175 g of hexanes were then loaded, and the mixture agitated for 15 minutes, and phase separated for 30 minutes. 207 g of water/amine layer was removed and 175 g more water was added with another mix/separate. 172 g of water/salt layer was removed and 175 g water then added with another mix/separate. 208 g of water/salt layer along with a small amount of product was removed for the final separation to give the product (Si10NMEA; 837 grams; 92% product recovery) with a conversion of chloropropyl functionality to aminoethanol in the product of 99.7%.

Example 3: Synthesis of Si10NP

The procedure of Example 1 was repeated using 5-amino-1-pentanol in place of NMEA to give the product (Si10NP) as a slightly yellow liquid.

Example 4: Synthesis of Si10EDA 37.2 g of Si10PrCl, 23 g ethylenediamine (EDA), and 6.0 g $Na_2CO_3$ were charged to a 200 ml receiving flask, which was then heated to and helt at 115° C. with an oil bath for 16 hours. Solids were then filtered from the reaction mixture, which was then concentrated in vacuo (rotovap; 80° C. and <1 mmHg) for 30 minutes to give the product (Si10EDA; almost colorless).

Example 5: Synthesis of Si7EDA 29.7 g of Si7PrCl, 23 g ethylenediamine (EDA), and 7.8 g $Na_2CO_3$ were charged to a 200 ml receiving flask, which was then heated to and helt at 120-130° C. with an oil bath for 5.5 hours. Solids were then filtered from the reaction mixture, which was then concentrated in vacuo (rotovap; 125° C. and <1 mmHg) for 30 minutes to give the product (Si7EDA; slightly yellow, clear liquid).

Example 6: Synthesis of Si10PDA 50 g of Si10PrCl, 25 g propylenediamine (PDA), and 2.62 g ZnO were charged to a 200 ml receiving flask, which was then heated to and helt at 140° C. with an oil bath for 9 hours. Solids were then filtered from the reaction mixture, which was then phase separated. The bottom layer was discarded, and top layer collected concentrated in vacuo (rotovap; 120° C. and <1 mmHg) for 60 minutes to give the product (Si10PDA; almost colorless).

Example 7: Synthesis of Si10HDA 15 g of Si10PrCl and 7.8 g 1,6-hexanediamine (HDA) were charged to a 100 ml flask, which was then heated to and helt at 160° C. with an oil bath for 24 hours. Solids were then filtered from the reaction mixture, which was then concentrated in vacuo (rotovap; 120° C. and <1 mmHg) for 60 minutes to give the product (Si10HD; yellow liquid).

Example 8: Synthesis of Si10EDA-SA 24.6 g of Si10NMEA and 2.85 g of succinic anhydride (SA) were charged to a 100 ml flask, which was then heated with an oil bath to and helt at 125-130° C. for 3 hours to give the product (Si10EDA-SA; slightly yellow liquid).

Example 9: Synthesis of Si10NMEA-MA 8.8 g of Si10NMEA and 1.0 g of maleic anhydride (MA) were charged to a 30 mL vial. The vial was heated with a heating block at ~100° C. for 1 hour. The product was a slightly yellow viscous liquid.

Example 10: Synthesis of Si10PDA-SA 9.4 g of Si10PDA and 1.07 g of maleic anhydride (MA) were charged to a 30 mL vial. The vial was heated with a heating block at ~100° C. for 4 hours. The product was a slightly yellow viscous liquid.

The terms "comprising" or "comprise" were used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "s" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A branched organosilicon compound having the following general formula:

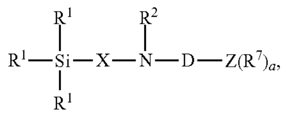

where each $R^1$ is selected from R and $—OSi(R^4)_3$, with the proviso that at least one $R^1$ is $—OSi(R^4)_3$; where each $R^4$ is selected from R, $—OSi(R^5)_3$, and $—[OSiR_2]_m$ $OSiR_3$; where each $R^5$ is selected from R, $—OSi(R^6)_3$, and $—[OSiR_2]_mOSiR_3$; where each $R^6$ is selected from R and $—[OSiR_2]_mOSiR_3$; with the proviso that at least one of $R^4$, $R^5$ and $R^6$ is $—[OSiR_2]_mOSiR_3$; where each R is independently an unsubstituted hydrocarbyl group or a halogen-substituted hydrocarbyl group; and where $0≤m≤100$;

where X is a divalent linking group;

where D is a divalent hydrocarbon group having from 2 to 18 carbon atoms;

where each $R^2$ is independently selected from substituted or unsubstituted hydrocarbyl groups and H;

Z is O or N;

where $R^7$ is independently selected from substituted or unsubstituted hydrocarbyl groups and H in each moiety indicated by subscript a; and where subscript a is the valency of Z, subject to one of the following provisos:

(i) wherein each $R^1$ is —$OSi(R^4)_3$, and wherein at least one of $R^4$ is —$[OSiR_2]_mOSiR_3$, or (ii) wherein the branched organosilicon compound has the following general formula:

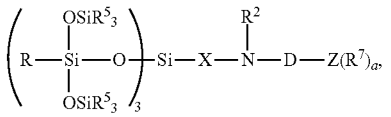

where each $R^5$, each $R^6$, and each R is independently selected and defined above; X is defined above, D is defined above, $R^2$ is defined above, Z is defined above, $R^7$ is defined above; and subscript a is defined above.

2. The branched organosilicon compound of claim 1, wherein: (i) X is a divalent hydrocarbon group having from 2 to 18 carbon atoms; (ii) each R is methyl; (iii) m is 0 or 1; or (iv) any combination of (i) to (iii).

3. The branched organosilicon compound of claim 1, wherein: (i) $R^2$ is —$CH_3$ or H; (ii) $R^7$ is H in each moiety indicated by subscript (a); or (iii) both (i) and (ii).

4. A method of preparing a branched organosilicon compound, said method comprising:

reacting (A) an organosilicon compound comprising a halogen functional group and (B) an amino-functional compound to give the branched organosilicon compound;

wherein the branched organosilicon compound is that of claim 1.

5. The method of claim 4, wherein the amino-functional compound (B) has the following formula:

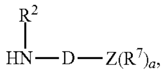

where $R^2$ is independently selected from substituted or unsubstituted hydrocarbyl groups and H; D is a divalent hydrocarbon group having from 2 to 18 carbon atoms; Z is O or N; $R^7$ is independently selected from substituted or unsubstituted hydrocarbyl groups and H in each moiety indicated by subscript a; and subscript a is the valency of Z.

6. The method of claim 5, wherein: (i) $R^2$ is —$CH_3$ or H; (ii) (ii) $R^7$ is H in each moiety indicated by subscript (a); or (iii) both (i) and (ii).

7. The method of claim 4, wherein the method prepares a reaction product comprising the branched organosilicon compound, and wherein the method further comprises isolating the branched organosilicon compound from the reaction product.

8. A composition comprising the branched organosilicon compound of claim 1.

* * * * *